US012676002B2

(12) United States Patent
Bodbyl et al.

(10) Patent No.: US 12,676,002 B2
(45) Date of Patent: Jul. 7, 2026

(54) PREMISES SECURITY SYSTEM WITH DYNAMIC RISK EVALUATION

(71) Applicant: Stealth Monitoring, Inc., Dallas, TX (US)

(72) Inventors: Colin Bodbyl, Oakville (CA); Jason Penny, Dallas, TX (US); David Del Giudice, Toronto (CA)

(73) Assignee: STEALTH MONITORING, INC., Dallas, TX (US)

( * ) Notice: Subject to any disclaimer, the term of this patent is extended or adjusted under 35 U.S.C. 154(b) by 0 days.

(21) Appl. No.: 17/960,115

(22) Filed: Oct. 4, 2022

(65) Prior Publication Data

US 2023/0021850 A1 Jan. 26, 2023

Related U.S. Application Data

(63) Continuation of application No. 16/510,666, filed on Jul. 12, 2019, now Pat. No. 11,475,672.

(51) Int. Cl.
| | |
|---|---|
| *G06V 20/52* | (2022.01) |
| *G06N 20/00* | (2019.01) |
| *G06V 20/00* | (2022.01) |
| *G06V 20/10* | (2022.01) |
| *G06V 20/40* | (2022.01) |
| *G08B 21/02* | (2006.01) |

(52) U.S. Cl.
CPC ............. *G06V 20/52* (2022.01); *G06N 20/00* (2019.01); *G06V 20/176* (2022.01); *G06V 20/39* (2022.01); *G08B 21/02* (2013.01); *G06V 20/44* (2022.01)

(58) Field of Classification Search
CPC ...... G06N 20/00; G06V 20/176; G06V 20/39; G06V 20/44; G06V 20/52; G08B 21/02; G08B 21/0261; G08B 31/00
See application file for complete search history.

(56) References Cited

U.S. PATENT DOCUMENTS

| | | | | |
|---|---|---|---|---|
| 8,272,053 | B2 * | 9/2012 | Markham | .............. G08B 31/00 |
| | | | | 726/25 |
| 10,043,360 | B1 * | 8/2018 | Mullins | .............. G08B 13/1968 |
| 10,489,661 | B1 * | 11/2019 | Rush | ........................ G06F 18/25 |
| 2003/0093514 | A1 | 5/2003 | Valdes et al. | |
| 2012/0133774 | A1 * | 5/2012 | Sarhan | ............. G08B 13/19645 |
| | | | | 348/E7.085 |

(Continued)

OTHER PUBLICATIONS

PCT/US20/37572 International Search Report and Written Opinion mailed Aug. 28, 2020, 12 pgs.

*Primary Examiner* — Shahan Ur Rahaman
(74) *Attorney, Agent, or Firm* — Perkins Coie LLP

(57) ABSTRACT

A technique is introduced for utilizing data associated with a monitored premises to determine a likelihood of a crime, or other activity, occurring at the premises. In an example embodiment, premises data is received from one or more sources including sensor devices located at the premises and other data sources including third-party databases. The premises data is processed using a machine learning model, such as an artificial neural network, to generate a risk score that is indicative of the likelihood of a crime occurring at the premises in real-time or in the future. The introduced technique for risk evaluation can be implemented in conjunction with a premises security system, for example, to route alarms generated by monitoring devices located at the premises.

20 Claims, 16 Drawing Sheets

(56)             References Cited

U.S. PATENT DOCUMENTS

| | | | | |
|---|---|---|---|---|
| 2016/0105644 | A1* | 4/2016 | Smith | G08B 13/19667 |
| | | | | 348/159 |
| 2017/0169231 | A1* | 6/2017 | Chhabra | G06F 21/577 |
| 2018/0219914 | A1* | 8/2018 | Reith | H04W 12/088 |
| 2018/0367561 | A1* | 12/2018 | Givental | G06N 20/00 |
| 2019/0095820 | A1* | 3/2019 | Pourmohammad | G06Q 10/067 |
| 2019/0138512 | A1* | 5/2019 | Pourmohammad | |
| | | | | G06Q 10/0635 |
| 2019/0188797 | A1* | 6/2019 | Przechocki | G06N 20/00 |
| 2021/0012115 | A1 | 1/2021 | Bodbyl et al. | |

* cited by examiner

500

START

502 Receive premises data associated with a monitored premises

504 Process the site data using a machine-learning risk model to determine a likelihood of a crime occurring at the monitored site 506 Generate risk score indicative of the likelihood of a crime occurring

END

900

START

902 Receive alarm signal indicative of a detected security event at a monitored premises 904 Access risk score for the monitored premises 906 Configure presentation of information indicative of the detected security event to an operator based on the risk score

END

Figure 11:
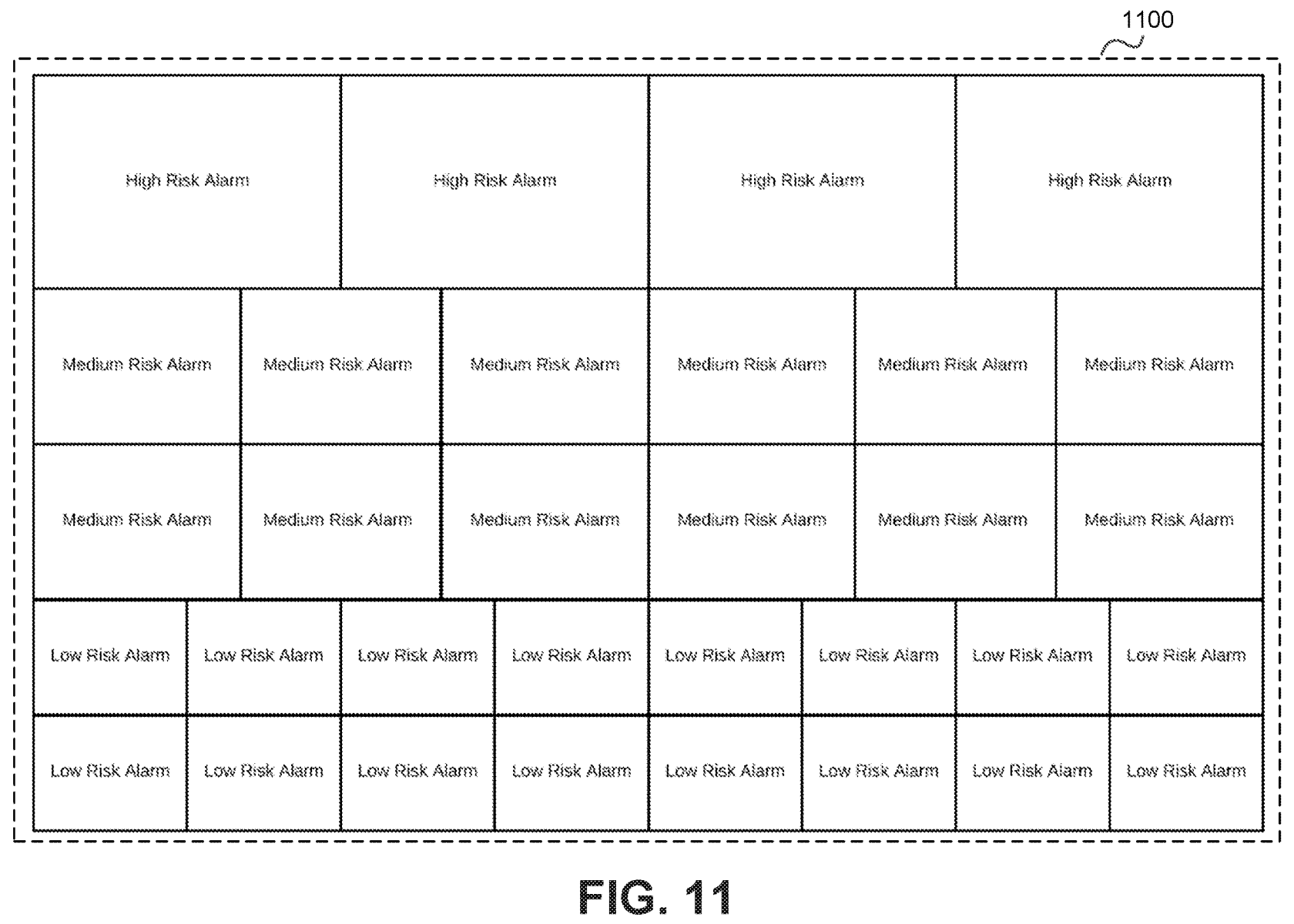

1100

| High Risk Alarm | High Risk Alarm | High Risk Alarm | High Risk Alarm |
|---|---|---|---|

| Medium Risk Alarm | Medium Risk Alarm | Medium Risk Alarm | Medium Risk Alarm | Medium Risk Alarm | Medium Risk Alarm |
| Medium Risk Alarm | Medium Risk Alarm | Medium Risk Alarm | Medium Risk Alarm | Medium Risk Alarm | Medium Risk Alarm |

| Low Risk Alarm | Low Risk Alarm | Low Risk Alarm | Low Risk Alarm | Low Risk Alarm | Low Risk Alarm | Low Risk Alarm |
| Low Risk Alarm | Low Risk Alarm | Low Risk Alarm | Low Risk Alarm | Low Risk Alarm | Low Risk Alarm | Low Risk Alarm |

START

1502 Receive indication of crime occurring at premises

1504 Compare risk score generated for premises to indication of crime occurring at premises 1506 Determine, based on comparison, to retrain machine learning risk model 1508 Retrain machine learning risk model

END

PREMISES SECURITY SYSTEM WITH DYNAMIC RISK EVALUATION

CROSS-REFERENCE TO RELATED APPLICATIONS

This application is a continuation of U.S. patent application Ser. No. 16/510,666 filed Jul. 12, 2019, entitled "PREMISES SECURITY SYSTEM WITH DYNAMIC RISK EVALUATION," which is incorporated herein in its entirety by reference for all purposes.

TECHNICAL FIELD

The present disclosure relates to premises security technology, in particular improvements in premises security technology involving dynamic evaluation of security risks using artificial intelligence and machine learning.

BACKGROUND

Conventional premises security systems include monitoring devices, such as cameras and motion detectors, located at a physical site, such as a building. The monitoring devices can be configured to generate alarms in response to specified conditions, such as detected motion. Alarms generated by monitoring devices can be forwarded to an operations center where human operators review the alarms and decide whether to take deterrent measures, such as triggering an audible alarm at the premises, and/or enforcement measures, such as notifying an enforcement authority.

BRIEF DESCRIPTION OF THE DRAWINGS

FIG. 11 shows a screen of another example GUI for displaying alarm information at an operator device;

DETAILED DESCRIPTION

Overview

Alarms generated or triggered by monitoring devices associated with premises security systems are sent to onsite or remote operators that review the alarms and decide whether to take deterrent measures, such as triggering an audible alarm at the premises, and/or enforcement measures, such as notifying an enforcement authority. Some existing premises security systems may generate certain types of alarms (e.g., fire, motion, water, etc.), but typically do not indicate an exact cause of the alarms. Accordingly, current premises security systems have limited to no ability to prioritize or flag certain alarms over other alarms. False alarms, for example, triggered by the motion of an animal, must be reviewed and cleared by operators in a similar manner as other alarms that are triggered by actual criminal activity. Even those existing security systems that do prioritize or flag alarms rely on manually defined conditions based on industry knowledge. Such existing approaches to premises security can be problematic, particularly in systems that process large volumes of alarms received from multiple client sites where time and resources spent processing false or otherwise low-priority alarms can greatly impact the ability of such systems to protect against actual threats.

Introduced herein is a technique for premises security that addresses the problems with existing technologies. Certain embodiments of the introduced technique utilize artificial intelligence, for example, in the form of machine learning models, to process data regarding actual conditions at a premises to determine a likelihood of certain high-risk activity, such as a crime, occurring at the premises. In an example embodiment, data retrieved from various sensors at a premises and/or from other sources is processed using one or more machine learning models, such as neural networks, to determine a likelihood of a crime occurring at any given moment. The determined likelihood can be quantified in the form of a risk score that can then be utilized to inform other processes associated with a premises security system, such as prioritizing alarms, routing alarms to certain operators, generating predictive alarms, etc.

Figure 1:
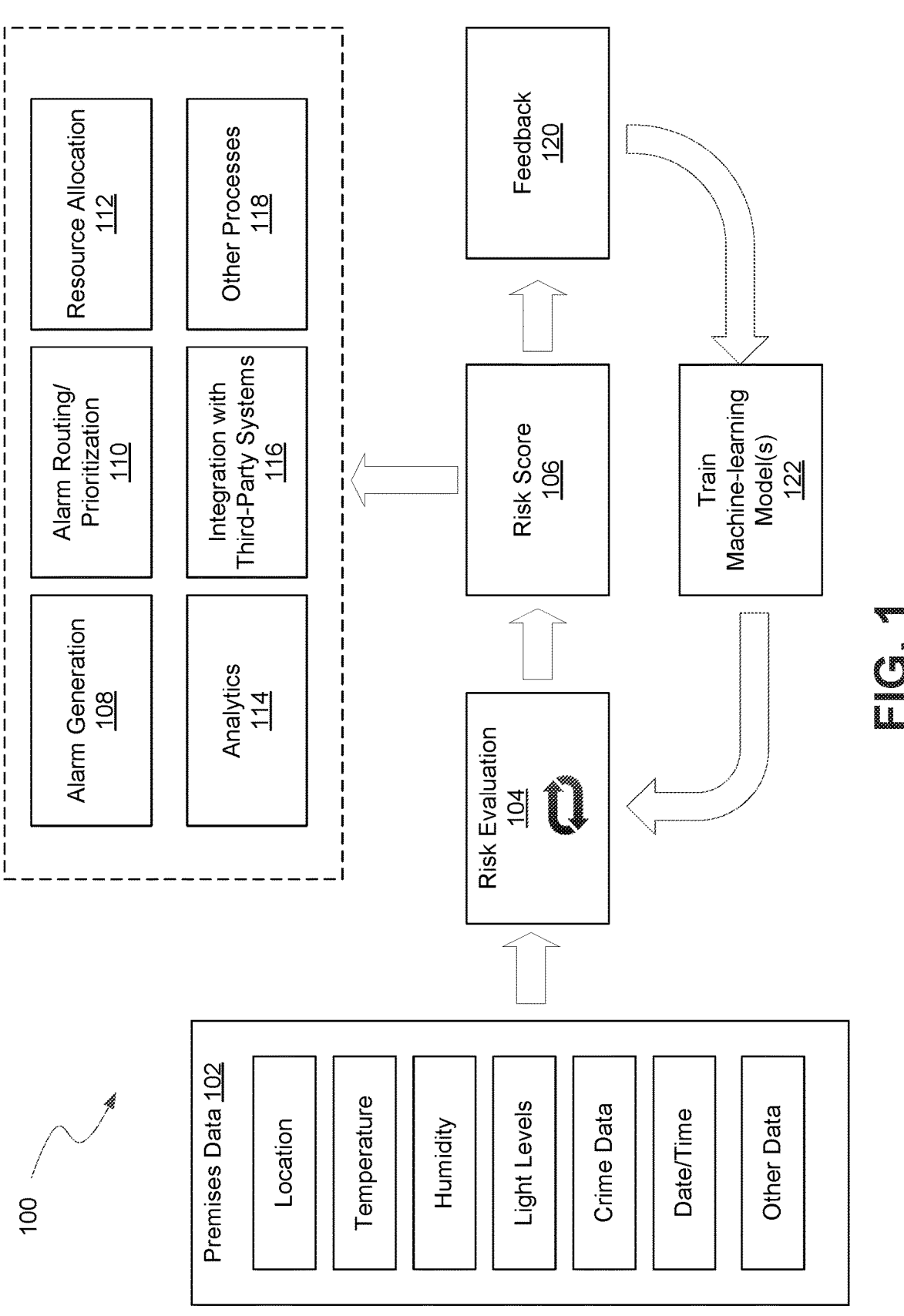
FIG. 1 shows a flow diagram that illustrates an example technique for risk evaluation using premises data.

FIG. 1 shows a flow diagram 100 that illustrates an example embodiment of the introduced technique at a high level. As shown in FIG. 1, various types of premises data 102 are input into a risk evaluation process 104 to generate a risk score 106. The premises data may include data associated with the location of the premises, the weather at the premises (e.g., temperature, humidity, etc.), the light levels at the premises, existing crime data at the location of the premises, the date and/or time at the premises, etc. Some of this premises data 102 may be collected by sensor devices that are located at or in proximity to the premises. For example, a temperature sensor can be installed at a monitored premises that continuously or continually transmits updated temperature readings. Some premises data may also be received from other data sources, such as crime databases or weather services.

The risk evaluation process 104 may include processing the premises data 102 using one or more risk models that employ machine learning techniques. In general, one or more risk models may be configured to apply algorithm(s) to the input premises data 102 to produce an output that conveys information indicative of a likelihood of certain activity, such as a crime, occurring at the premises. The types of algorithms applied by the one or more risk models may vary depending on the nature of the premises data and the requirements of the implementation, but may include, for example, decision trees, Naïve Bayes classifiers, support vector machines, random forests, artificial neural networks (e.g., feedforward neural networks, recurrent neural networks, etc.), or any other appropriate machine learning algorithms.

As mentioned, in some embodiments, the output of the risk evaluation process 104 may include, or may be utilized to generate, a risk score 106 associated with the premises. In some contexts, this risk score 106 may represent a quantified evaluation of a likelihood of crime occurring at the premises in real-time and/or in the future. In some embodiments, the risk model(s) may be configured such that the risk score 106 represents a quantified evaluation of a likelihood of particular type of crime occurring, such as burglary, larceny, assault, vandalism, arson, etc. In some embodiments, the risk model(s) may be configured such that the risk score 106 represents a quantified evaluation of a likelihood of other types of notable events occurring even if such events do not qualify as a crime. Other notable events may include, for example, accidents, injuries, natural disasters, animal attacks, etc.

The risk score 106 may comprise a generated value. In some embodiments, the risk score 106 may comprise a numerical value, for example, between 0 and 1, with 0 representing a lowest risk and 1 representing a highest risk. In some embodiments, the risk score 106 may comprise a categorical value, such as "low risk," "medium risk," or "high risk." In some embodiments, the categorical value for the risk score 106 may be binary, for example, "risk," versus "no risk." A person having ordinary skill will recognize that the manner in which the risk score is implemented will depend on the requirements of a given embodiment. In some embodiments, the risk score 106 may comprise a set of multiple values. For example, an individual risk value may be computed for each type of premises data (e.g., weather, location, light level, etc.) associated with a given premises. In some embodiments, each of these multiple risk values may be weighted according to the relative importance of the type of premises data. For example, a risk value based on the location of the premises may be weighted more heavily than a risk value based on the weather.

In some embodiments, the risk evaluation process 104 may continually generate or update the risk score 106 as premises data is received. For example, a system may be set up such that premises data 102 is received in real-time or near-real-time (e.g., within seconds or fractions of a second) as the premises data 102 is generated for risk evaluation processing 104. In such an embodiment, the risk evaluation process 104 may produce a risk score 106 that dynamically changes in real-time or near-real-time as new premises data 102 is received. In some embodiments, the risk evaluation process 104 may instead be performed periodically at regular or irregular intervals (e.g., every minute, hour, day, etc.) to update the risk score 106 for a given premises. For example, a system may be configured to pull premises data 102 from various sources periodically (e.g., every hour), process the premises data, and generate a risk score 106. This sequence of steps can then be repeated at the next period interval to update the risk score 106.

The risk score 106 can represent a quantified risk evaluation based on real-time conditions at a premises and/or may represent a quantified risk evaluation based on predicted or forecast conditions. For example, as described in the previous paragraph, in some embodiments, premises data 102 can be processed in real-time as it is gathered to generate a risk score 106. Such a risk score 106 would represent quantified risk evaluation based on real-time conditions at the premises. Alternatively, in some embodiments, historical premises data 102 (e.g., collected over a particular time frame) can be processed to generate a risk score 106 for the premises that represents a quantified risk evaluation based on predicted or forecast conditions. Accordingly, in some embodiments, the risk score 106 for a given premises may actually comprise two or more values, including at least a real-time risk score and a forecast risk score. These multiple risk scores may be utilized for different purposes. For example, as will be described, a real-time risk score can be utilized to inform processes that rely on real-time response, such as alarm routing, while a forecast risk score can be utilized for other processes, such as premises security analytics 114.

In some embodiments, a risk score 106 is generated for each premises. For example, a security system tasked with monitoring multiple premises at different locations may generate a risk score 106 for each premises based on data 102 specific to each premises. Risk scores can also be generated, for example, on a per-entity basis, on a per-cohort basis, on a per-geographical region basis, etc. For example, a risk score associated with an entity may be based on premises data 102 associated with multiple premises operated by that entity. An "entity" in this context may include an individual, an enterprise, a government organization, etc. As an illustrative example, an entity risk score may be generated for a car dealership that is based on premises data 102 associated with multiple car lots operated by the car dealership. A risk score associated with a cohort may be based on premises data associated with multiple entities that satisfies some criterion defining a cohort. A "cohort" in this context refers to any type of grouping of entities that exhibit one or more similarities. Returning to the example of the car dealership, a cohort risk score may be generated based on premises data 102 associated with multiple car lots operated by multiple different car dealerships. In this example, the cohort is defined as "car dealerships." The cohort definition applied to generate the risk score 106 may be constrained based on one or more conditions, such as within geographic boundary, entity size, etc. For example, the "car dealerships" cohort can be constrained to be "car dealerships selling luxury vehicles in a defined municipality."

As alluded to above, the risk scores 106 can be generated based on various combinations of premises data 102. Accordingly, as used herein, the term "risk score" may actually refer to a set of multiple different risk scores and/or an aggregation of multiple different risk scores. As an illustrative example, a risk score 106 for a car dealership located in Chicago, Illinois may comprise a set of multiple different risk scores, including a premises-specific risk score for each premises operated by the car dealership, an entity-specific risk score for the car dealership, a cohort-specific risk score for all dealerships in Chicago, and a geographic risk score for all of Chicago. Alternatively, the risk score for the car dealership may represent an aggregation of these multiple individual risk scores. For example, the risk score 106 for the car dealership may represent an average of the multiple individual risk scores. In such an embodiment, each of the individual risk scores may include an associated weight value that affects the impact of that individual risk score on the aggregate risk score 106. For example, a premises-specific risk score would likely be weighted more heavily than a broad geographic risk score for a large city such as Chicago.

In any event, the risk score 106 can be utilized by a security system to inform various other processes, such as alarm generation 108, alarm routing and/or prioritization 110, resource allocation 112, security analytics 114, integration with third-party systems 116, and various other processes 118.

In the case of alarm generation, risk scores 106 can be utilized to trigger certain alarms. For example, the sensitivity of monitoring devices may be dynamically configured based on a current risk score 106 associated with a premises to affect whether certain alarms are triggered. In an example embodiment, the sensitivity of a monitoring device such as a motion detector may be lowered when the risk score 106 is below a threshold value to reduce false alarms while the sensitivity of that same device is increased when the risk score is above a threshold value to surface any potential threats. As another illustrative example, risk scores 106 may themselves trigger predictive alarms indicative of a prediction of a crime occurring at a premises even if no corresponding alarm is received from a monitoring device.

In the case of alarm routing and/or prioritization 110, risk scores 106 can be utilized to flag alarms when a likelihood of criminal activity is relatively high and/or selectively route such alarms to certain operators for review. The prioritization and routing of alarms based on risk score is described in more detail later.

In the case of resource allocation, risk scores 106 can be utilized, for example, to schedule operators in a central monitoring facility, allocate computing resources for processing data, etc. For example, a central monitoring facility can dynamically respond to heightened risk scores observed during certain days, times, etc. by staffing more operators during such periods of heightened risk. As another example, computing resource may be allocated, for example, to transmit and process additional data (e.g., live video feed) for certain alarms that are associated with a heightened risk score.

In the case of security analytics 114, risk scores can be stored, tracked, aggregated, etc., by the system to produce analytics that can be presented, for example, to various users for review and analysis. Various types of users including administrators, operators, clients, etc., may interface with a security system via an interface presented at a computing device. As an illustrative example, risk scores 106 and/or other data based on the risk scores 106 can be presented to individual clients of a security system as a service. A client of a premises security system may access a dashboard, for example, via a web-based portal to view the current real-time risk scores for each of their monitored premises as well as other data, such as historical risk scores or forecast risk scores, alarm history, data from monitoring devices (e.g., security camera feeds), etc.

In the case of third-party integration 116, risk scores 106 may be made accessible to various third parties for their individual use. A "third-party" in this context refers to any entity that does not operate, manage, own, or otherwise control the system generating the risk score 106. Examples of third-parties that may access risk score data include enforcement agencies (e.g., local police), vendors (e.g., security camera providers), etc. As an illustrative example, a security camera provider may access generated risk scores 106 to train computer vision algorithms utilized at the security cameras. In some embodiments, risk scores may be accessible to third parties via an application programming interface (API).

In some embodiments, one or more machine-learning models associated with the risk evaluation process 104 can be trained and/or retrained at step 122 using various training data such as the premises data 102, risk scores 106 based on premises data 102, feedback data 120 including review of results by operators, and any other suitable training data. In other words, the risk evaluation process 104 can be continually improved based on recent data in a feedback loop.

Technology Environment

Figure 2:
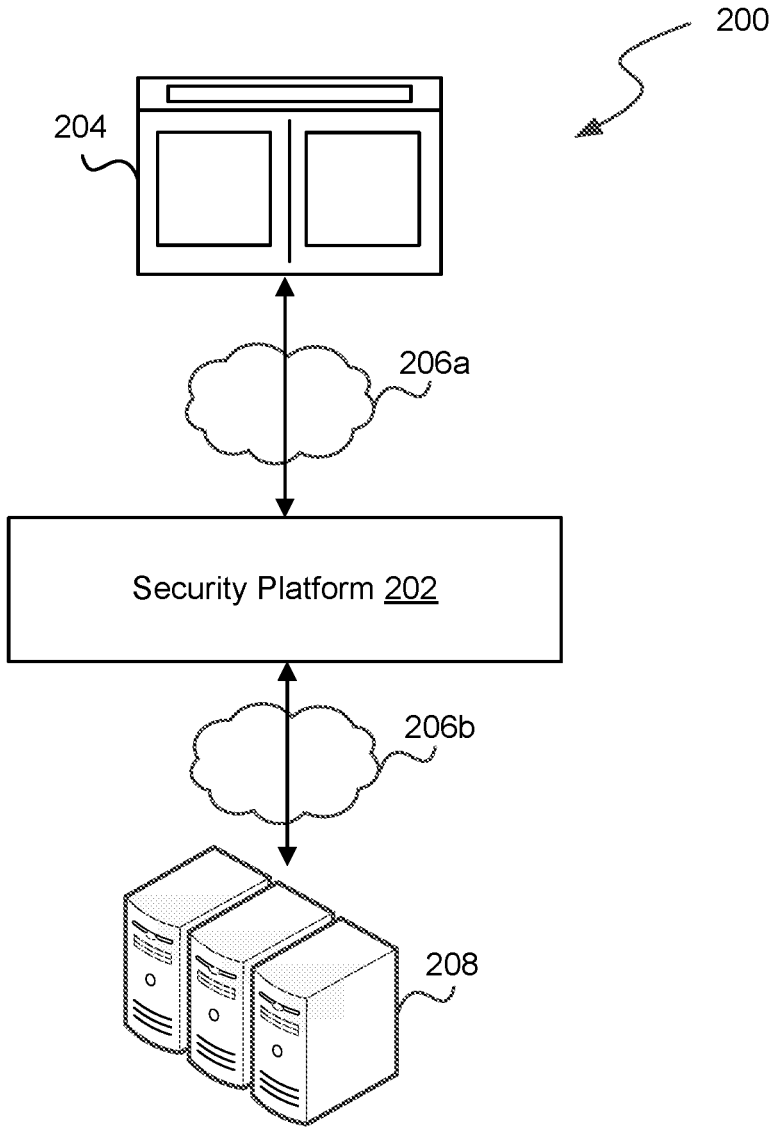
FIG. 2 shows an architecture diagram of an example networked computing environment in which the introduced technique can be performed.

FIG. 2 shows a diagram of an example network environment 200 in which the introduced technique can be performed. As shown in FIG. 2, the network environment includes a security platform 202. Individuals can interface with the security platform 202 via an interface 204. For example, administrators may access the interface 204 to develop and/or train risk models or to configure alarm procedures. Monitoring center operators may access interface 204 to review generated alarms and trigger deterrent and/or enforcement measures. Premises client may access interface 204 to view situational dashboards and/or to review generated alarms.

As shown in FIG. 2, the security platform 202 may reside in a network environment 200. Thus, the security platform 202 may be connected to one or more networks 206a-b. The network(s) 206a-b can include personal area networks (PANs), local area networks (LANs), wide area networks (WANs), metropolitan area networks (MANs), cellular networks, the Internet, etc. Additionally, or alternatively, the security platform 202 can be communicatively coupled to computing device(s) over short-range communication protocols such as Bluetooth™ or Near Field Communication (NFC).

The interface 204 may be accessible via a web browser, desktop application, mobile application, or over-the-top (OTT) application. Accordingly, the interface 204 may be viewed on a personal computer, tablet computer, mobile workstation, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

In some embodiments, portions of the security platform 202 are hosted locally. That is, at least some of the security platform 402 may reside on a computing device located at a monitored site. For example, the security platform 202 may be embodied software executing on a security workstation located at a monitored site. In other embodiments, the security platform 202 is hosted at a location that is remote from the one or more monitored sites. For example, a centralized security service may manage and operate a security platform 202 that is embodied in software executing at one or more server computers at a facility that are communicatively coupled to monitoring devices and other sensors at one or more monitored sites. In such embodiments, premises data 102, and any other information utilized to generate risk scores 106, may be retrieved from remotely located servers 408 or other devices that are communicatively coupled to the monitoring devices and other sensors. In some embodiments, the security platform 202 may be executed by a cloud computing service operated by a third-party such as Amazon Web Services™ (AWS), Google Cloud Platform™, Microsoft Azure™, or a similar technology.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., premises data 102, risk scores 106, risk models, etc.) to be downloaded at a single point in time or on a periodic basis (e.g., weekly, daily, or hourly).

Figure 3:
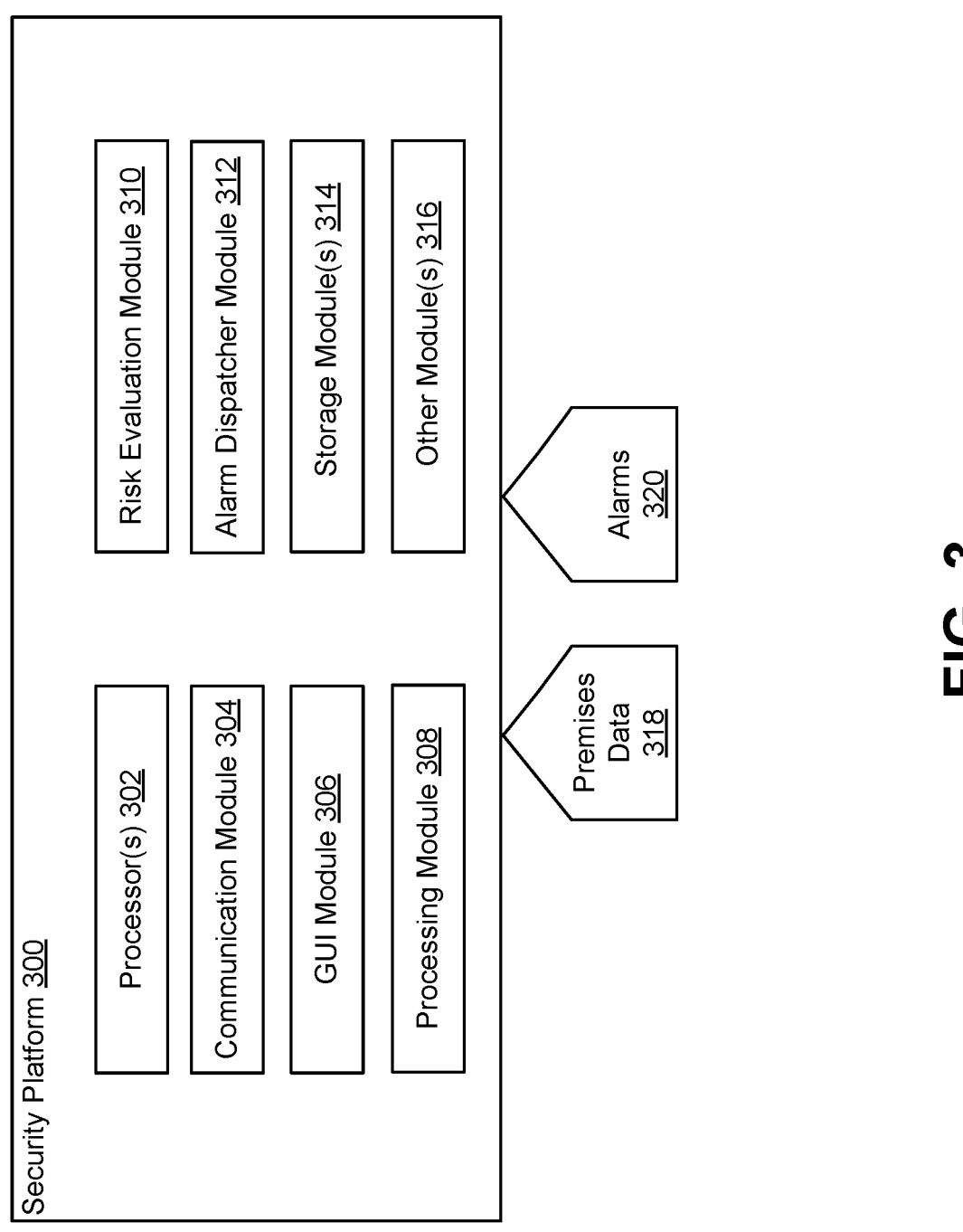
FIG. 3 shows an architecture diagram of an example security platform capable of performing the introduced technique.

FIG. 3 shows a high-level architecture of an example security platform 300 capable of performing the introduced technique. The security platform 300 may process premises data 318 to determine a likelihood of certain events such as crimes occurring at a premises, generate risk scores based on that likelihood, and utilize the risk scores to perform other processes such as alarm routing.

The security platform 300 can include one or more processors 302, a communication module 304, a graphical user interface (GUI) module 306, a processing module 308, a risk evaluation module 310, an alarm dispatcher module 312, one or more storage modules 314, and one or more other modules 316. In some embodiments a single storage module includes multiple computer programs for performing different operations, while in other embodiments each computer program is hosted within a separate storage module. Embodiments of the security platform 300 may include some or all of these components, as well as other components not shown here.

The processors 302 can execute modules from instructions stored in the storage modules 314, which can be any device or mechanism capable of storing information. For example, the processors 302 may execute the GUI module 306, processing module 308, risk evaluation module 310, alarm dispatcher module 312, and/or other modules 316.

The communication module 304 can manage communications between various components of the security platform 300. The communication module 304 can also manage communications between a computing device on which the security platform 300 resides and other devices.

For example, the security platform 300 may reside on a workstation in the form of a desktop application. In such embodiments, the communication module 304 can facilitate communication with a network-accessible computer server responsible for supporting the desktop application and/or a monitoring device responsible for generating alarms. The communication module 304 may facilitate communication with various data sources through the use of application programming interfaces (APIs), bulk data interfaces, etc. Examples of data sources include locally accessible databases, network-accessible databases, sensors, monitoring devices, other applications, etc.

As another example, the security platform 300 may reside on a server system that includes one or more network-accessible computer servers. In such embodiments, the communication module 304 can communicate with a computer program executing on a computing device accessible to an individual, such as a mobile phone, desktop computer, or mobile workstation. For example, a human operator may review alarms generated by monitoring devices by interacting with the security platform 300 via a workstation computer. As another example, an administrator may configure or train risk models used for generating risk scores by interacting with the security platform 300 via a workstation computer. Those skilled in the art will recognize that the components of the security platform 300 can be distributed between the server system and the computing device in various manners.

The GUI module 306 can generate the interface(s) through which an individual can interact with the security platform 300. For example, an interface may include a listing of various alarms generated by monitoring devices. As another example, an interface may include a situational map indicating locations of generated alarms.

The processing module 308 can apply one or more operations to various data such as premises data 318 and alarms 320 that are acquired by the security platform 300. For example, the processing module 308 may extract sensor data from one or more sensors located at a premises. As another example, the processing module 308 may retrieve premises data such as crime data or weather data from a third-party data source. In some embodiments, the processing module 308 may perform operations on incoming data to format the data for use with other processes in the system. For example, the processing module 308 may process incoming premises data 318 from multiple different sources to format the premises data 318 for use by the risk evaluation module 310. This may include interpreting data, transforming data, filtering data, etc.

A data source such as a sensor device may be configured to continuously or periodically transmit premises data 318 and/or alarms 320 to the security platform 300. In some embodiments, the source continually uploads premises data 318 and/or alarms 320 to the security platform 300 so long as the source remains communicatively coupled to the computing device on which the security platform 300 resides (e.g., via a network communication channel). For example, sensor data may be streamed from a sensor device or a sensor controller to the security platform 300 in real-time or near-real-time as the sensor data are generated. In other embodiments, the source uploads data to the security platform 300 on a periodic basis (e.g., hourly, daily, or weekly). The security platform 300 can be configured to pull data from the source. Additionally, or alternatively, the source can be configured to push data to the security platform 300. In some embodiments, an individual (e.g., an administrator) is able to configure these push/pull settings. These settings can be configured on a source-by-source basis.

Upon receiving premises data 318, a risk evaluation module 310 may first identify an appropriate risk model to apply to the premises data 318. For example, the security platform 310 may operate multiple different risk models that are specifically configured for different tasks. The multiple risk models may be maintained in a library stored in the storage modules 314. In some embodiments, a different risk model is maintained for each premises. In some embodiments, a different risk model is maintained for each type of activity (e.g., each type of crime), in some embodiments, different risk models are maintained for different geographic locations (e.g., different municipalities). In some embodiments, different risk models are maintained for different industry sectors (e.g., car dealerships vs. banks). Once one or more risk models are selected, the risk evaluation module 310 proceeds to process the received premises data 318 using the one or more risk models to produce outputs such as risk scores. As previously mentioned, the risk models may apply various machine learning algorithms to the premises data 318 to produce the outputs.

The outputs from the risk evaluation module 310 (e.g., risk scores) can be utilized to perform various other processes. In some embodiments, an alarm dispatcher module 312 is configured to process received alarms 320 and conditionally prioritize and/or route those alarms to certain operators based on a risk score associated with the alarm. Other modules 316 may similarly rely on the outputs from the risk evaluation module 310.

Figure 4:
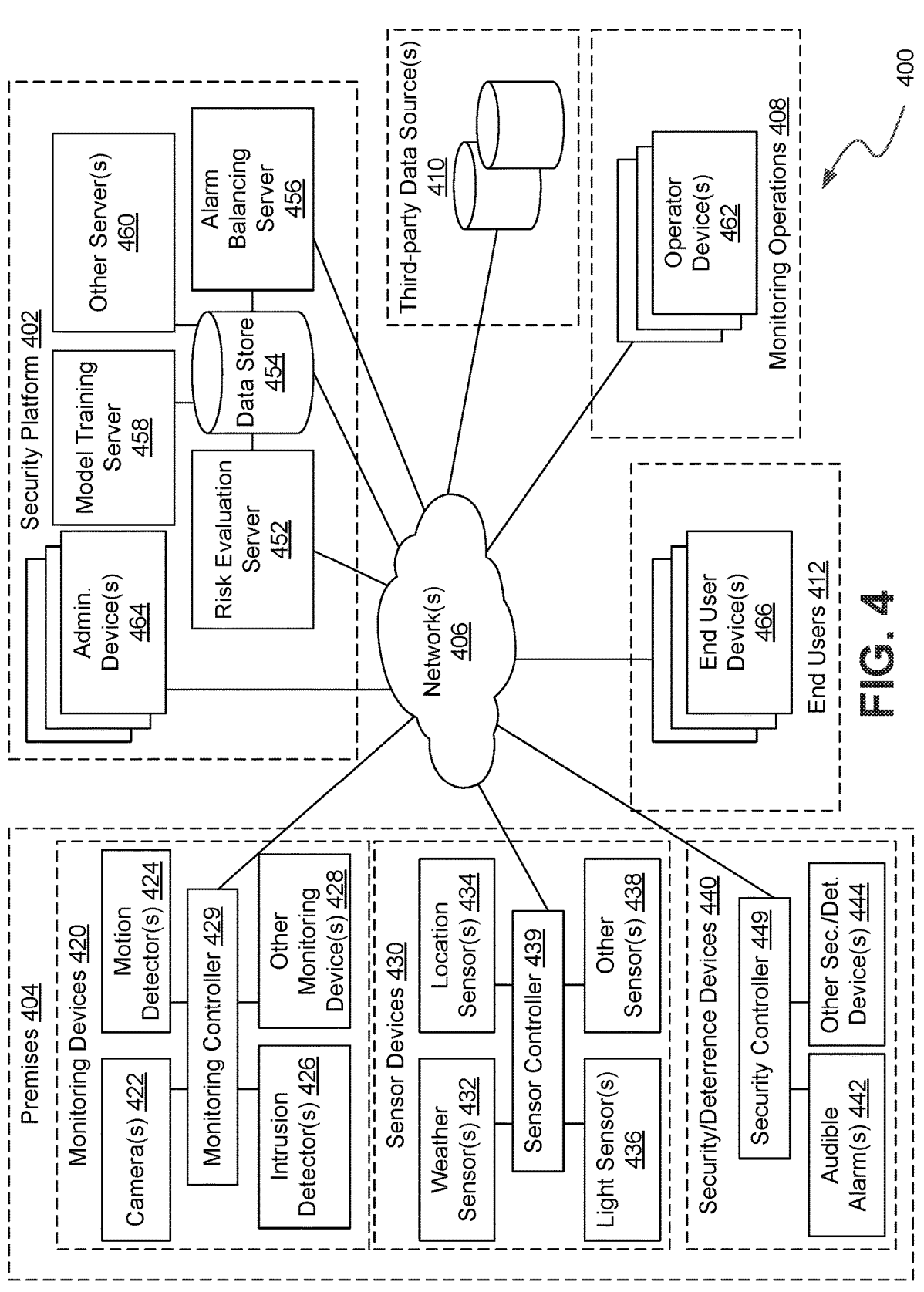
FIG. 4 shows an architecture diagram of an example communication environment that includes a security platform.

FIG. 4 shows an example communication environment 400 that includes a security platform 402. As shown in FIG. 4, the security platform 402 (e.g., similar to security platform 202 and 300) is communicatively coupled (e.g., via one or more networks 406) to various devices at a monitored premises 404, a monitoring operations facility 408, and various third-party data sources 410. The one or more networks 406 may be the same or similar as networks 206a-b. The monitored premises 404 may represent one of multiple different physical premises that receive security services provided by the security platform 402. For example, premises 404 may comprise a building and the immediate physical environment surrounding the building. Premises 404 may also include a portion of a building such as a monitored tenant space on one or more floors of a multi-floor building. Premises 404 may also include a portion of a physical environment (e.g., a plot of land) with no physical structures other than the devices used for securing and monitoring the premises. In, for example, environment 400, the premises 404 includes various monitoring devices 420, other sensor devices 430, and security/deterrence devices 440.

Monitoring devices 420 include devices that are configured to generate or trigger alarms in response to detected events at the premises 404. Examples of monitoring devices 420 include security cameras 422, motion detectors 424, instruction detectors 426 (e.g., glass break sensors, door break sensors, etc.), as well as other monitoring devices 428 (e.g., microphones, proximity sensors, etc.). In some embodiments, the multiple monitoring devices 420 at a premises 404 are communicatively coupled to one or more monitoring controllers 429 that receive signals from the various monitoring devices 420 and transmit signals, via network 406 to the security platform 402.

In some embodiments, the monitoring controller 429 receives signals from the monitoring devices 420, generates alarms based on the received signals, and transmits the alarms, via network 406, to the security platform 402. In other embodiments, the monitoring controller 429 merely forwards and possibly filters alarms that are generated at the monitoring devices 420. In some embodiments, a monitoring controller 429 is not necessary and each of the monitoring devices 420 are individually communicatively coupled to security platform 402 via network 406. For example, a network-connected security camera 422 may be configured to transmit signals including alarms and video streams for delivery to the security platform 402.

Sensor devices 430 include devices that are configured to gather sensor data at the premises. For example, the sensor data gathered by the various sensor devices 430 may include the premises data used at platform 402 to generate a risk score for the premises 404. Examples of sensor devices 430 include weather sensors 432 (e.g., temperature sensors, humidity sensors, rainfall sensors, etc.), location sensors 434 (e.g., GPS), light sensors, as well as other sensors 438. As with the monitoring devices 420, sensor devices 430 may be communicatively coupled to one or more sensor controllers 439 that receive signals from the various sensor devices 430 and transmit signals, via network 406 to the security platform 402. In some embodiments, the sensor controller 439 processes sensor data received from the various sensor devices 430, generate premises data based on the sensor data, and transmits the premises data, via network 406, to the security platform 402. For example, the sensor controller 439 may aggregate or transform received sensor data into a format that is useable by the security platform 402. In other embodiments, the sensor controller 439 merely forwards and possibly filters sensor data that are generated at the sensor devices 430. In some embodiments, a sensor controller 439 is not necessary and each of the sensor devices 430 are individually communicatively coupled to security platform 402 via network 406. For example, a network-connected weather sensor 432 may be configured to transmit weather data, via network 406, for delivery to the security platform 402.

In some embodiments certain monitoring devices 420 and sensor devices 430 may refer to the same or similar devices. For example, a camera 422 or intrusion detector 426 may represent a sensor device. Similarly, a light sensor 436 may represent a monitoring device. The different terms "sensor device" and "monitoring device" are used herein to highlight the different roles of such devices. Specifically, as used herein monitoring devices 420 are those devices that are associated with the generation of alarms. Conversely, sensor devices 430 are those devices that are associated with the generation of sensor data utilized to produce risk scores. In some embodiments, a single device at the premises 404 may be both a monitoring device and a sensor device. For example, a security camera can be used as a monitoring device to detect motion and generate alarms based on the detected motion. The same security camera can also be used as a sensor device to sense certain conditions at the premises, such as light levels, and generate premises data based on the sensed conditions.

Security and/or deterrence devices 440 include devices that take active measures to prevent or remediate the occurrence of unfavorable events such as criminal activity at the premises. Security and/or deterrence devices may include audible alarms 442 intended to scare away would be intruders. Other security and/or deterrence devices 444 may include, for example, visual alarms (e.g., flashing lights) and access control devices, such as automatic locks, to restrict access to the premises. Other devices 444 may also include a protection device, such as fire suppression systems or smoke alarms, to deal with conditions that are not related to criminal activity. The one or more security and/or deterrence devices 440 may be communicatively coupled to one or more security controllers 449 that are communicatively coupled to the security platform 402 and/or a monitoring operations facility 408. For example, a security controller 449 may receive signals from a security platform 402 and/or a separate operations facility 408 that are indicative of an event occurring at premises 404. This signal from the security platform 402 and/or operations facility 408 may have been in response to an alarm generated by one or more monitoring devices 420 at the premises 404. In response to received signals, the security controller 449 may trigger or activate one or more security and/or deterrence devices 440 to respond to the event. For example, the security controller 449 may activate an audible alarm 442 in response to a break in event. In other embodiments, the security controller 449 merely forwards signals received from the security platform 402 and/or operations facility 408 to the one or more security and/or deterrence devices 400. In some embodiments, a security controller 449 is not necessary and each of the security and/or deterrence devices 440 are individually communicatively coupled to security platform 402 and/or operations facility 408 via network 406. For example, a network-connected audible alarm 442 may be configured to receive signals, via network 406, from the operations facility 408.

In some embodiments, the security platform 402 may include one or more server computers (physical and/or virtual devices), such as a risk evaluation servicer 452, an alarm balancing server 456, and a model training server 458. The risk evaluation server 452 is tasked with receiving and/or retrieving premises data from the one or more sensor devices 430 located at the premises and/or from other data sources, such as third-party data sources 410, and generating risk scores based on the premises data. Third-party data sources 410 may include, for example, crime databases, weather services, location services (e.g., map databases, GPS services, etc.), or any other sources of data.

A data store 454 may be implemented to store any type of data that is useable by the components of the security platform 402 to perform the technique described herein. In some embodiments, premises data retrieved from the one or more sources can be stored in a data store 454 that is accessible to the risk evaluation server 452. Data store 454 may also include libraries of risk models that can be utilized by the risk evaluation server 452 to generate a risk score for the premises 404, for example, as described with respect to FIG. 1. The data store 454 may also store the risk scores generated by the risk evaluation server 452. The term "data store" is used herein for illustrative simplicity to refer to any component or set of multiple components for storing data associated with a security platform 402. The term "data store" is not intended to limit the disclosure to a specific type of storage device, data structure, or storage technique. For example, as used herein, the term "data store" is understood to encompass other terms such as "data storage," "data warehouse," "database," "data mart," "data lake," "data repository," etc.

The alarm balancing server 456 can apply risk scores generated by the risk evaluation server 452 to alarms received from the monitoring devices 420 at the premises 404. For example, in response to receiving an alarm, the alarm balancing server 456 may access a risk score stored in data store 452 and apply the accessed risk score, for example, to route the alarm to an appropriate operator device 462 at an operations facility 408 or to prioritize the alarm.

The model training server 458 can perform processes to train machine learning models, perform pre-deployment testing of machine learning models, and deploy trained and tested machine learning models. In some embodiments, a model training server can access training data from the data store to train machine learning risk models that can be deployed for use by the risk evaluation server 452. This training data can include premises data as well as data from other sources that are not specifically related to a given premises.

The security platform 400 can also include other servers 460 such as web servers, content servers, proxy servers, mail servers, application servers, etc., that perform various processes. For example, a web server and/or application server may provide access to an interface (e.g., similar to interface 204) to the security platform 402 for various computing devices, such as operator devices 462, end user devices 466, and/or administrator devices 464.

The various servers depicted in FIG. 4 are examples provided for illustrative purposes and are not to be construed as limiting. In some embodiments, all of the processes described herein may be performed by a single physical or virtual computing device. Alternatively, one or more of the servers depicted in FIG. 4 may actually represent a system of multiple physical and/or virtual computing devices. Further, other embodiments of a security platform may logically group servers differently than as depicted in FIG. 4. For example, in an alternative embodiment, risk score generation and alarm balancing may be performed by one server and model training by another server.

Users may access certain functionality of the security platform 402 using various computing devices. "Users" in this context can include security platform administrators, human operators at a monitoring operations facility 408, and end users 412. Operators can use operator devices 462 to, for example, review and clear alarms, trigger security/deterrence devices 440, contact enforcement authorities, etc. Security platform administrators can use administrator devices 464 to, for example, set certain operational parameters of the security platform 402, configure machine learning models, monitor machine learning model performance, supervise model training, etc. End users, such as premises owners or security managers, can use end user devices to, for example, review alarms, view streams such as video from cameras 422 at the premises, view risk score information, set certain user preferences, etc. In any case, the operator devices 462, administrator devices 464, and end user devices 466 can include any type of computing device capable of communication with other devices over the one or more networks 406. For example, operator devices 462, administrator devices 464, and end user devices 466 may include a personal computer, tablet computer, mobile workstation, PDA, mobile phone, wearable electronic device (e.g., a smart watch), network-connected ("smart") electronic device, (e.g., a television or home assistant device), virtual/augmented reality system (e.g., a head-mounted display), or any other type of electronic device.

In some embodiments, a risk score may represent a single continually updated entry in the data store 454. In other words, once updated, the data store 454 may not retain any record of past risk scores. Alternatively, in some embodiments, risk scores can be versioned and associated with timestamps such that the risk scores can be temporally associated with alarms as they are received at the security platform 402. In other words, in response to receiving an alarm from premises 404, the alarm balancing server 456 may identify a first timestamp associated with the alarm and then identify a risk score with an associated second timestamp that most closely matches the first timestamp. The alarm balancing server 456 may then apply the identified risk score to the received alarm. This entire process may occur in real-time or near-real-time of the alarm being generated at premises 404 and received at security platform 402.

As alluded to above, in some embodiments, alarms generated at premises 404 are routed to one or more operator devices 462 at an operations facility by alarm balancing server 456. The operations facility 408 may represent one or more centralized alarm monitoring centers where human operators review incoming alarms to determine actions to take. For example, an interface may be presented at each of the one or more operator devices 462 through which human operators can interact with the security platform 402. Using the interface presented at operator devices 462, human operators can review incoming alarms, clear false alarms, trigger security deterrence devices 440 at premises 404, and/or communicate with enforcement authorities (e.g., local police). Although depicted in FIG. 4 as separate entities, in some embodiments the monitoring operations platform 408 may be conceptualized as part of security platform 402. Alternatively, in other embodiments, the monitoring and operations facility 408 may represent a separate entity that just receives alarms dispatched by security platform 402. In other words, the security platform 402 and operations facility 408 may be operated, managed, owned, or otherwise controlled by separate entities.

Generating a Risk Score

Figure 5:
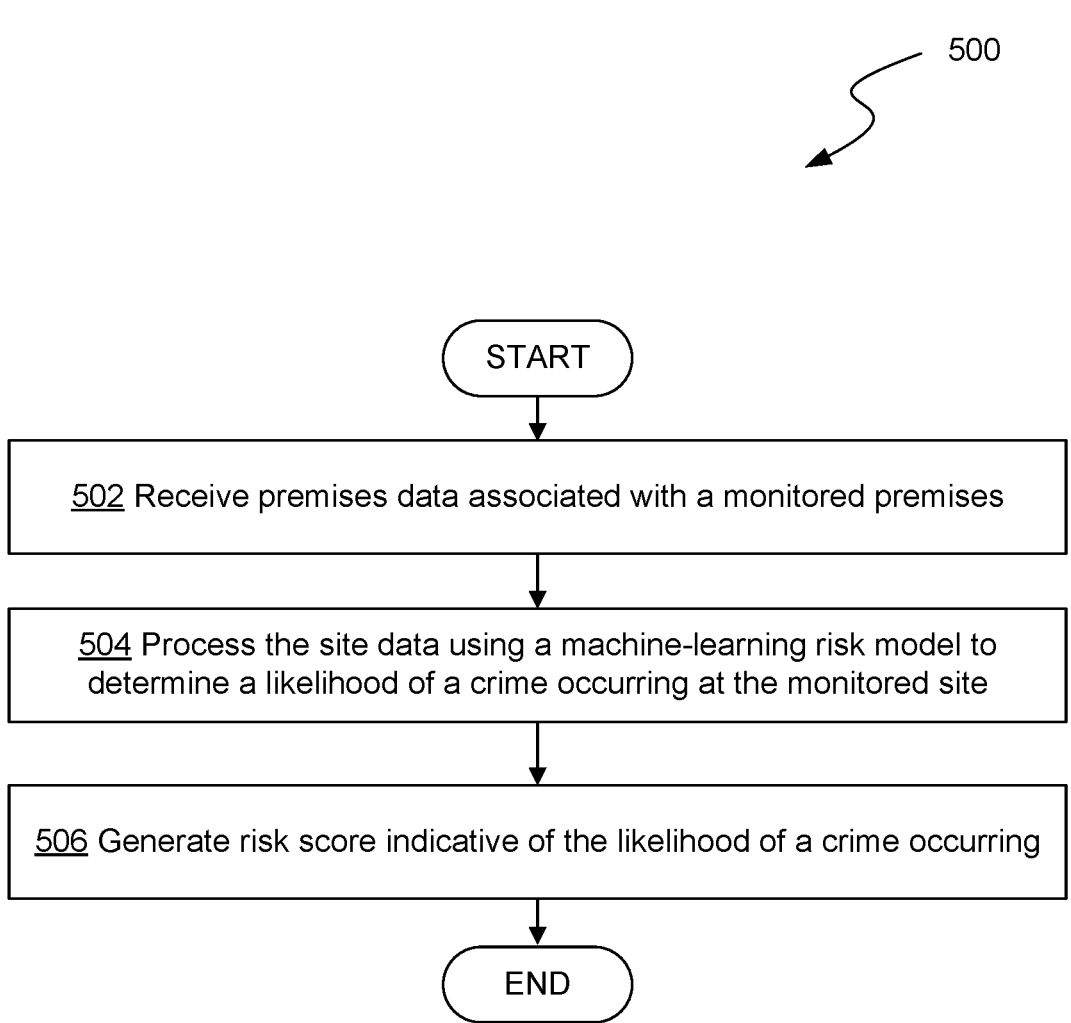
FIG. 5 shows a flow diagram of an example process for generating a risk score associated with a monitored premises.

FIG. 5 depicts a flow diagram of an example process 500 for generating a risk score associated with a monitored premises. The steps of example process 500 may be implemented as instructions stored in memory that are executed by a computing device associated with a security platform such as the risk evaluation server 452 described with respect to FIG. 4.

Example process 500 begins at step 502 with receiving premises data associated with a monitored premises. As previously discussed, premises data may include sensor data gathered from one or more sensors located at, or in proximity to, the monitored premises and/or data from third-party data sources.

Example process 500 continues at step 504 with processing the premises data received at step 502 using one or more machine learning risk models to determine a likelihood of certain high-risk event such as criminal activity occurring at the site. In some embodiments, the likelihood determined at step 504 refers to an instantaneous likelihood of an event, such as a crime, occurring at a time the premises data was collected given the characteristics of the premises data. In other words, the premises data is processed using a machine learning risk model to determine a likelihood that an event such as a crime is in progress at a time the premises data was collected. In other embodiments, the likelihood determined at step 504 may refer to a prediction that an event, such as a crime, will occur within some time horizon given the characteristics of the premises data.

Example process 500 continues at step 506 with generating a risk score indicative of the likelihood of an event, such as a crime, occurring. As previously discussed, the risk score may comprise a generated numerical value (e.g., between 0 and 1) or a categorical value, such as "low risk," "medium risk," or "high risk."

Prioritizing and Routing Alarms Based on Risk Score

Risk scores generated by a security platform can be utilized to flag alarms when a likelihood of a certain event, such as a crime occurring, is relatively high and/or selectively route such alarms to certain operators for review.

Figure 6:
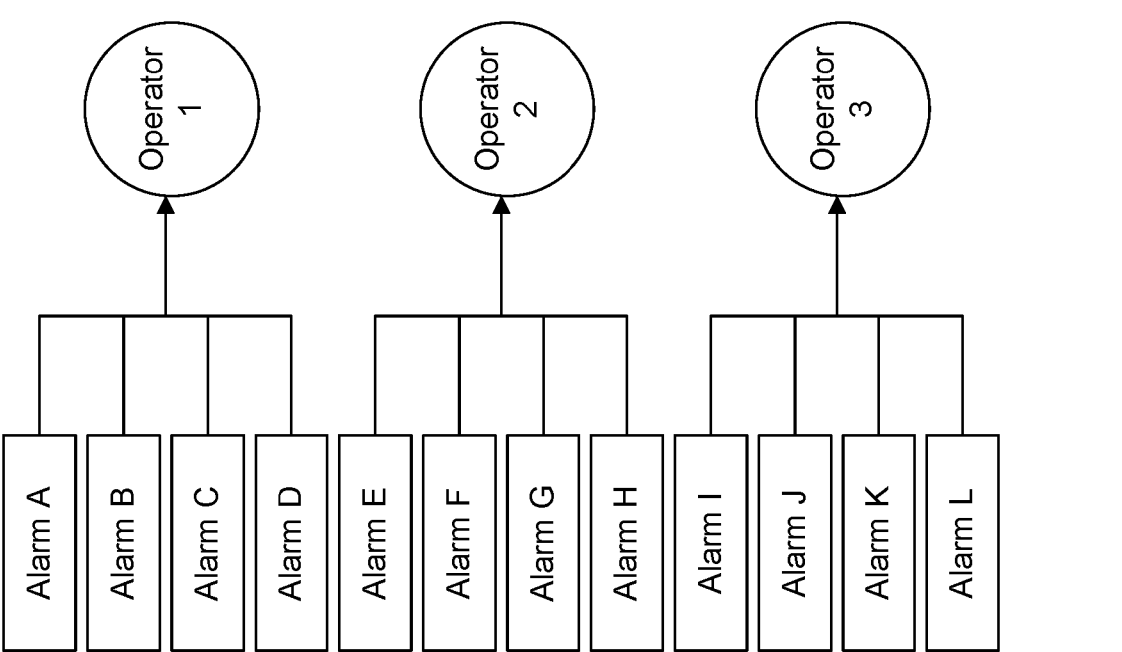
FIG. 6 shows a flow diagram that illustrates how alarms are routed to operators for review in existing security systems.

FIG. 6 shows a flow diagram that illustrates how alarms are routed to operators for review in existing security systems. As shown in FIG. 6, multiple alarms may be routed to each of multiple operators for review. Many existing systems do not take any steps to route certain alarms to certain operators that may be more suited to review the alarms. This can lead to overloading certain operators and routing high-priority alarms to lower skill operators, both of which can impact the efficacy of the overall security system. Although not depicted in FIG. 6, some existing systems may implement a pooling technique for load balancing in which alarms are routed into a queue (i.e., a "pool") from which multiple operators can select alarms for review. While a pooling technique may avoid overloading certain operators, such a technique may still reduce overall efficacy and/or efficiency where lower priority alarms are selected over higher priority alarms and/or where certain alarms are selected by operators without the appropriate skill sets and/or experience.

Figure 7:
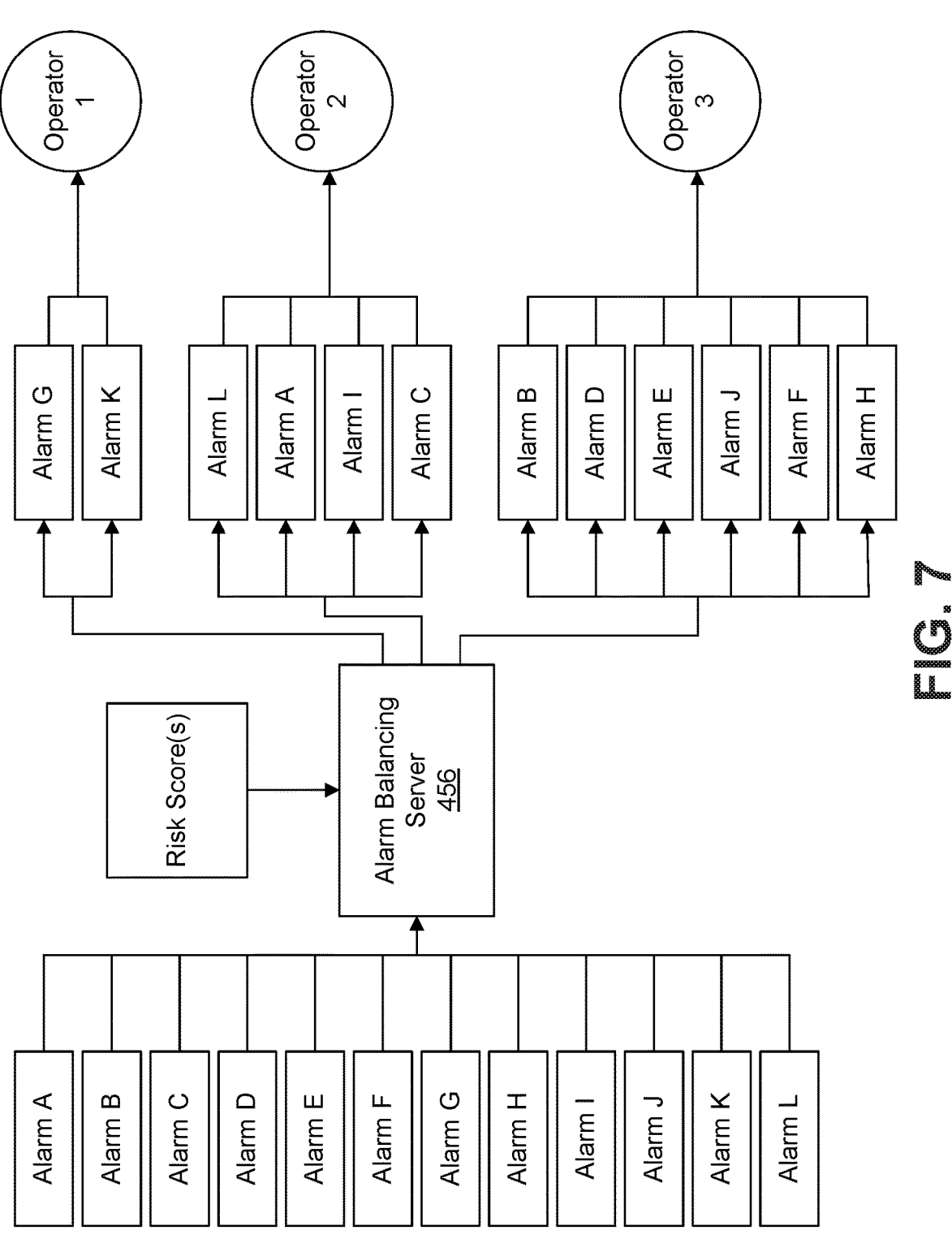
FIG. 7 shows a flow diagram that illustrates an example process for routing alarms based on risk score.

Instead, the introduced technique for machine learning based risk evaluation can be applied to prioritize and/or route alarms to operators. FIG. 7 shows a flow diagram that illustrates at a high level an example process for routing alarms based on risk score. As shown in FIG. 7, multiple alarms may be routed to each of multiple operators for review. In this case each of the multiple operators may have a different skill level or area of expertise. Instead of randomly assigning alarms to each of operators, an alarm balancing server 456, for example, as described with respect to FIG. 4, is introduced to handle prioritizing and routing of alarms. Specifically, the alarm balancing server 456 receives both alarms and risk scores associated with the alarms and then routes, then prioritizes and/or routes the alarms to an appropriate operator based on the risk scores.

As an illustrative example, in response to receiving Alarm A from a particular premises, alarm balancing server 456 retrieves a current risk score for the particular premises. Using the received risk score for the particular premises, the alarm balancing server 456 then determines that Alarm A is associated with a medium risk and proceeds to route Alarm A to Operator 2 (a medium-risk operator) for review. For example, the risk score retrieved for the particular premises may have a categorical value of "medium risk" or a numerical value of 0.5 (in a range between 0.0 and 1.0) indicative of a medium risk. Conversely, Alarm G is routed to Operator 1 (a high-risk operator) and Alarm B is routed to Operator 3 (a low-risk operator) based on the respective risk scores associated with those alarms.

Also, alarms routed to each operator may be prioritized in some manner, for example, by flagging certain alarms, displaying the alarms in an order based on priority, etc. For example, although Alarm A and Alarm L are both routed to Operator 2, Alarm L is listed before Alarm A, indicating that Alarm L has a higher priority than Alarm A. In this scenario, Alarm L may be associated with a higher risk score (e.g., 0.6) than the risk score associated with Alarm A (e.g., 0.5).

FIG. 7 depicts an example scenario in which alarms are prioritized and routed to multiple tiers of operators (e.g., high risk, medium risk, and low risk). In such an embodiment, the alarm balancing server 456 may be configured using rules that define how alarms are routed based on associated risk score. This is referred to herein as a routing scheme. In some embodiments, the routing scheme specifies one or more criteria that define how alarms are routed. A specified criterion may be set, for example, or more threshold values associated with risk score. As an illustrative example, alarm balancing server 456 may employ a routing scheme with a first threshold value above which alarms are routed to Operator 1 and a second threshold value lower than the first threshold value below which alarms are routed to Operator 3. Any alarms associated with risk scores that fall between the first threshold value and second threshold value would satisfy the specified criterion for routing to Operator 2 and are therefore routed to Operator 2.

The threshold values associated with the routing scheme can be static or dynamic. For example, an administrator user may set one or more static threshold values when configuring a routing scheme for the alarm balancing server 456. Alternatively, or in addition, the alarm balancing server 456 may be configured to dynamically respond to changing conditions by adjusting the one or more threshold values of a routing scheme. Changing conditions may include operator workload, network throughput, processing load, etc. As an illustrative example, in response to detecting a low workload for Operator 1, the alarm balancing server 456 may automatically lower the first threshold value such that more alarms are routed to Operator 1.

The three-tiered routing scheme depicted in FIG. 7 is just an example provided for illustrative purposes and is not to be construed as limiting. Other routing schemes based on risk score may similarly be employed to meet the requirements of a given implementation while remaining within the scope of the present disclosure.

Figure 8:
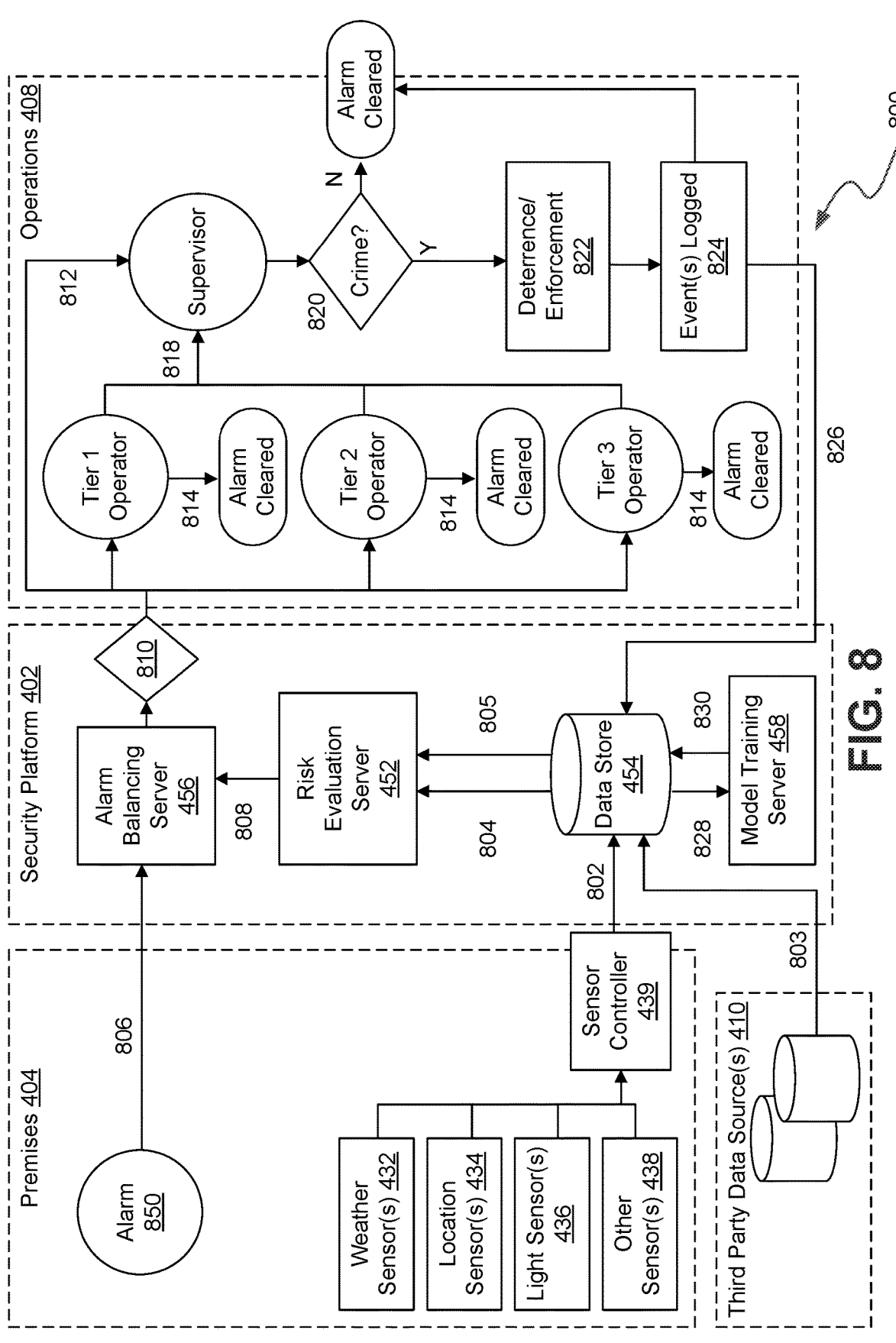
FIG. 8 shows an architecture flow diagram that illustrates an example process for routing alarms based on risk score.

FIG. 8 shows an architecture flow diagram that illustrates an example process 800 for routing alarms based on risk score. Certain steps of the example process 800 are described with respect to the components of the example communication environment 400 described with respect to FIG. 4.

Example process 800 begins with the security platform 402 receiving and/or retrieving premises data from sensors located at premises 404 at step 802 and/or third-party data sources 410 at step 803. As discussed with respect to FIG. 4, the sensor devices at premises 404 may include weather sensors 432, location sensors 434, light sensors 436, as well as other sensors 438. One or more of the sensors may be communicatively coupled to a sensor controller 439 that retrieves the sensor data and transmits the sensor data to security platform 402.

In some embodiments, the premises data received and/or retrieved at steps 802 and/or 803 are stored in a data store 454 associated with security platform 402. The premises data stored at data store 454 can then be accessed by other processes associated with the security platform.

At step 804, a risk evaluation server 452 accesses the data store 454 to receive and/or retrieve premises data. The risk evaluation server 452 then processes the received premises data, for example, using one or more machine learning risk models, to generate a risk score for the premises 404. This risk score may be continually updated and stored so as to be accessible to an alarm balancing server 456.

In some embodiments, the risk evaluation server 452 may, at step 805, access the data store 454 to receive and/or retrieve one or more machine learning models that are utilized to process the premises data. For example, data store 454 may include a library of multiple machine learning models that can be accessed by the risk evaluation server 452, as needed. In some embodiments step 805 may include the risk evaluation server 452 selecting a particular machine learning model from a library of multiple machine learning models. This selection can be performed, for example, based on inputs from an administrator, premises data, etc.

At step 806, the alarm balancing server 456 receives an alarm 850 from the premises 404. The alarm may be generated by any number of monitoring devices at the premises 404, such as cameras 422, motion detectors 424, intrusion detectors 426, or other monitoring devices 428.

At step 808, the alarm balancing server 456 retrieves the risk score for the premises 404 from the risk evaluation server 452 or an associated data store 454 and applies the risk score to the received alarm 850. The risk score received at step 808 may represent a real-time risk score as opposed to a forecast risk score. As previously discussed, in some embodiments, in response to receiving the alarm 850 from premises 404, the alarm balancing server 456 may identify a first timestamp associated with the alarm 850 and then identify a risk score with an associated second timestamp that most closely matches the first timestamp. The alarm balancing server 456 may then apply the identified risk score to the received alarm 850. This entire process may occur in real-time or near-real-time of the alarm being generated at premises 404 and received at the alarm balancing server 456.

At step 810, the alarm balancing server 456 applies one or more routing schemes to determine where to route alarm 850 based on the associated risk score. As previously discussed, in some embodiments, the routing scheme may specify one or more routing criteria, such as threshold values for risk scores, that specify how an associated alarm 850 is to be routed. Similar to the scenario depicted in FIG. 7, the flow chart of FIG. 8 includes multiple operator tiers. For example, tier 1 operators may be higher skilled operators that are tasked with reviewing high risk alarms, tier 2 operators may be medium skilled operators that are tasked with reviewing medium risk alarms, and tier 3 operators may be lower skilled operators that are tasked with reviewing low risk alarms. The routing scheme applied at step 810 may include one or more threshold values that specify how the alarm 850 is routed based on the associated risk score. These threshold values can be set by administrator users or automatically by the system itself. Further, the threshold values may remain static or may dynamically change in response to detected conditions, as described with respect to FIG. 7.

In some embodiments, the routing scheme applied at step 810 may be configured to drop or ignore certain alarms based on an associated risk score. For example, if the risk score is below a threshold value (i.e., indicating relatively low risk of criminal activity), the alarm balancing server 456 may just ignore and drop the alarm instead of forwarding the alarm to one of the operators at the monitoring operations facility 408. By doing so, the alarm balancing server 456 may alleviate congestion at the monitoring operations facility 408 and reduce the likelihood of false positive responses from operators. In some embodiments, the threshold criterion for dropping alarms may be configured to dynamically change based on the changing workload at the monitoring operations facility 408. For example, if the workload is low, the threshold value may be decreased so that more new alarms are forwarded. Conversely, if the workload is high, the threshold value may be increased so that fewer new alarms are forwarded.

In the example process 800 depicted in FIG. 8, the monitoring operations facility 408 also includes a supervisor in addition to the multiple tiers of operators. In some embodiments, the routing scheme applied at step 810 may be configured to, at step 810, route certain alarms (e.g., highest priority alarms) directly to the supervisor instead of to one of the operators. Note that a supervisor is not necessary in all embodiments and that certain steps described below as being performed by a supervisor may also be performed by any one or more of the operators.

In any case, in response to identifying the appropriate routing for the alarm 850, the alarm balancing server 456 transmits the alarm (or information associated with the alarm) to one of the operators (e.g., in tier 1, 2, or 3) or to the supervisor for review. In some embodiments, the risk score associated with an alarm may be attached as metadata to an alarm before routing. For example, in some embodiments, as part of routing the alarm, the alarm balancing server 456 may generate a message that includes information indicative of the alarm (e.g., timestamp, premises identifier, alarm type, etc.) as well as information indicative of a risk score accessed from the risk evaluation server 452 or associated data store 454. The risk evaluation server 456 may then transmit the generated message to an appropriate operating device based on the routing scheme.

The routed alarm (or associated information) is then received at an appropriate operator device where it can be reviewed by an operator. For example, an indication of the alarm 850 may be presented via an interface displayed at an operator device 462 associated with a human operator or supervisor. The operator reviewing the alarm 850 can, at step 814, clear the alarm if the operator determines the alarm to be a false alarm or the operator can elect to, at step 818, escalate the alarm to the supervisor for further review.

At step 820, the supervisor reviews any escalated alarms that have not been cleared to determine if an event, such as a crime, is in progress that requires action. If there is no event that requires action, the alarm is cleared; however, if action is required, the supervisor may take certain steps at 822 to, for example, trigger security and/or deterrence devices 440 at the premises 404 or notify enforcement authorities, such as local police, to investigate.

The supervisor may further update an event log at step 824 with information regarding the event that triggered the alarm before clearing the alarm. In some embodiments, an event log is updated automatically by a computer system associated with the security platform 402 and/or operations facility 408.

In some embodiments, the information contained in the event log can, at step 826, be transferred to the security platform 402 and stored in the data store 454.

In some embodiments, data stored in the data store 454 can be used as training data to train one or more machine learning models. For example, in some embodiments, a model training server 458 can, at step 828, access training data from the data store 454. Training data can include, for example, premises data retrieved at steps 802 and/or 803, event log data retrieved at step 826, or other data. In some embodiments, the training data accessed at step 828 may include a processed portion of the premises data and/or event log data. For example, training data may include data that has been labeled, for example, by security experts, as indicative of one or more high-risk events. Accordingly, in some embodiments, training data used to train the one or more machine learning models may be stored separately from operation data used by the risk evaluation server 452 to generate risk scores.

Once training is complete, the model training server 458 may, at step 830, store a trained model in the data store 454.

In some embodiments, deployed models can be retrained in response to certain events. For example, the event log transferred at step 826 can include an indication of whether a crime is actually associated with a given alarm. This information can then be utilized to automatically retrain a machine learning risk model. For example, in response to receiving an indication that a crime has actually occurred at premises 404 (e.g., based on a log transmitted at step 826), the model training server 458 may access the data store 454 to retrieve premises data for the premises 404. The retrieved premises data may include the current premises data and/or historical premises data that is associated with a particular time at which the crime actually occurred. This can be determined based on timestamps in the premises data.

The model training server 458 can then evaluate whether a machine learning risk model needs to be retrained, for example, by comparing a risk score output based on the retrieved premises data to the indication that an actual crime has occurred. For example, if a risk score output by the risk model is high (i.e., indicating that a crime is highly likely), then the risk model may not need retraining. Conversely, if the risk score output by the risk model is low (i.e., indicating that a crime is not likely), the risk model may need retraining. In some embodiments, the decision to retrain a risk model may be based on a threshold criterion. For example, if an indication is received of an actual crime, a model training server 458 may automatically retrain a model in response to determining that a risk score output by the model at a time the crime occurred is below a threshold value. Other types of criteria can similarly be set to determine when to retrain a model.

Configuring Presentation of Alarms Based on Risk Score

Alarms can be presented to operators for review via an interface at an operator device 462, such as a desktop computer or other computerized workstation. In some embodiments, the presentation of such alarms can be configured based on the risk scores associated with the alarms.

Figure 9:
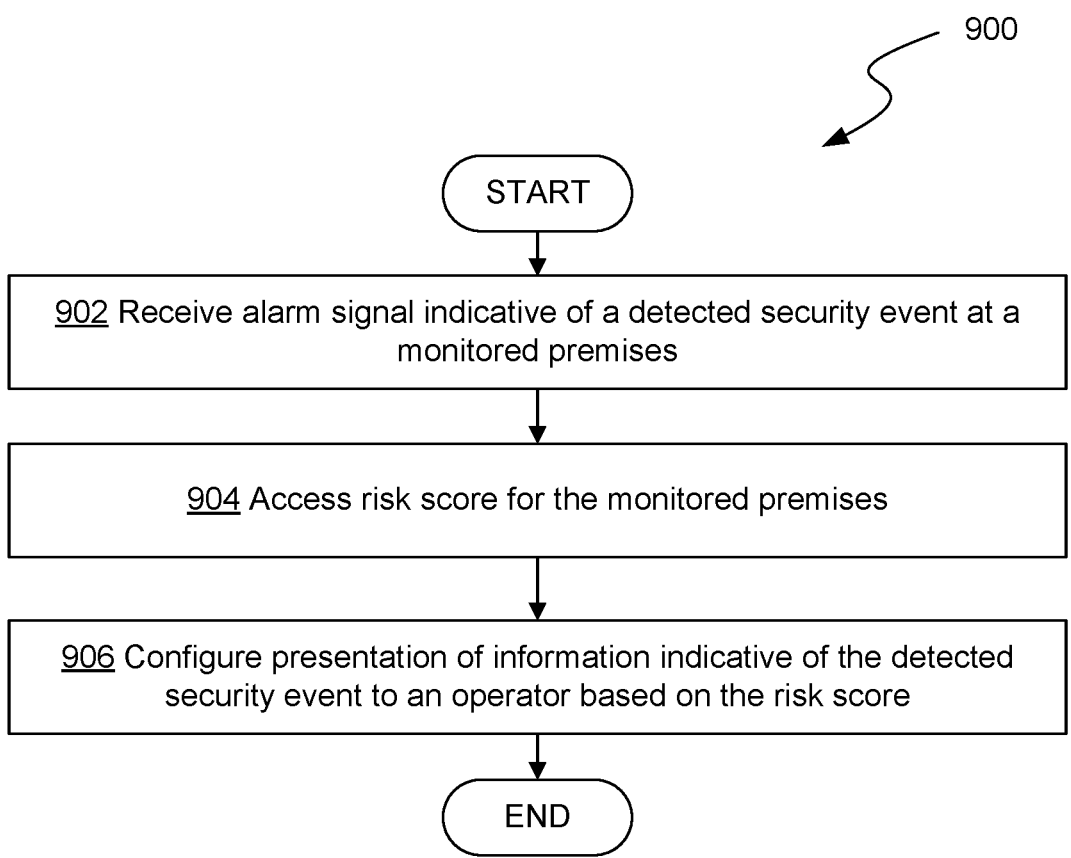
FIG. 9 shows a flow diagram of an example process for configuring the presentation of alarms based on risk score.

FIG. 9 depicts a flow diagram of an example process 900 for configuring the presentation of alarms based on risk score. The steps of example process 900 may be implemented as instructions stored in memory that are executed by a computing device associated with a security platform such as operator device 462 described with respect to FIG. 4.

Example process 900 begins at step 902 with receiving an alarm signal indicative of a detected security event at a monitored premises. For example, an operator device 462 may receive an alarm signal, via a network 406, from an alarm balancing server 456 according to process 800 described with respect to FIG. 8.

Example process 900 continues at step 904 with accessing a risk score for the monitored premises. In some embodiments, the risk score associated with an alarm may be attached as metadata to the received alarm. As previously mentioned, in some embodiments, the risk score may be included as metadata in a message associated with the received alarm signal. Alternatively, or in addition, the operator device 462 may independently communicate with the risk evaluation server 452 to access the risk score associated with the received alarm.

Example process 900 concludes at step 906 with configuring the presentation information indicative of the detected security event to an operator based on the risk score associated with the received alarm. In some embodiments, step 906 may include visually prioritizing indications of alarms if the accessed risk score satisfies a specified criterion (e.g., above a threshold value). Indications of alarms can be visually prioritized, for example, by highlighting the indication, sizing the indication larger relative to indications of lower priority alarms, placing the indication of the alarm higher in a displayed listing of multiple indications of other alarms, etc. As previously discussed, alarms can be presented to operators via an interface such as a GUI. Accordingly, step 906 may include configuring the GUI in response to a received alarm based on a risk score associated with the alarm.

Figure 10:
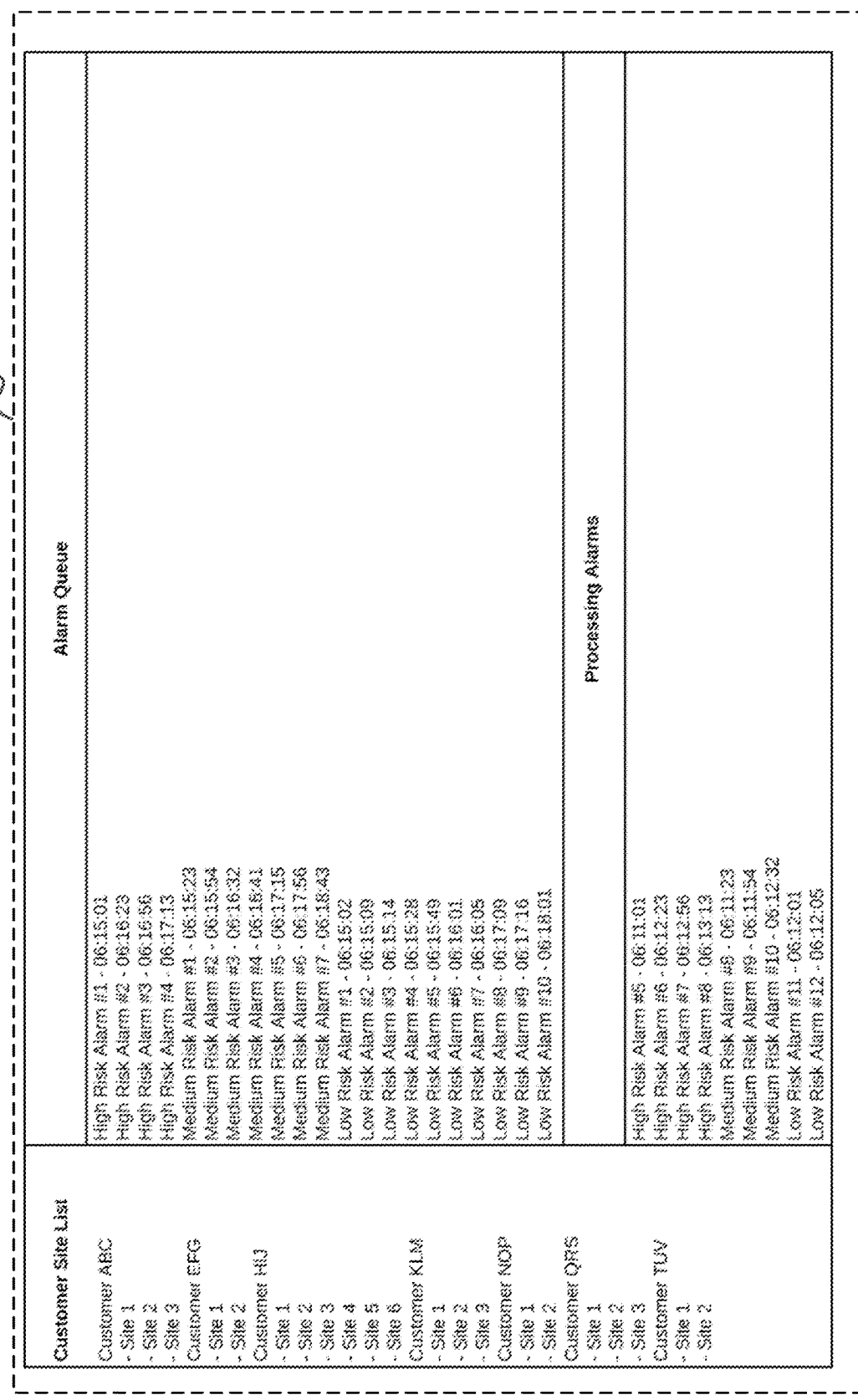
FIG. 10 shows a screen of an example graphical user interface (GUI) for displaying alarm information at an operator device.

FIG. 10 shows a screen 1000 of an example GUI that may be displayed at an operator device 462. The GUI displaying screen 1000 may be displayed using a web browser, desktop application, mobile application, OTT application, or any other type of software instantiated at the operator device 462. As shown in FIG. 10, the example screen 1000 displays an alarm queue that includes multiple alarms that are ordered based on priority and time. Specifically, all of the high-risk alarms are listed first in chronological order followed by the medium risk alarms and low risk alarms. As previously discussed, these priority designations may be based on the risk scores associated with the premises originating the alarms.

FIG. 11 shows a screen 1100 of another example GUI that depicts an alternative technique for displaying alarms to an operator. As shown in FIG. 11, the multiple alarms are represented by graphical elements (e.g., icons) that are sized and arranged relative to each other based on priority level. Specifically, high-risk alarms are sized larger and located at the top of screen 1100, while low-risk alarms are sized smaller and located at the bottom of screen 1100. Again, the priority for each alarm may be based on the risk scores associated with the premises originating the alarms.

Although not depicted in FIG. 10 or 11, in some embodiments, a GUI can also be configured to display certain information and/or provide certain options based on a risk score associated with a given alarm. For example, an indicator associated with a high-risk alarm may include a live video feed from a camera at the premises, as well as an option to interact with or control other cameras at the premises. As another example, certain relevant premises data used to generate the risk score may be presented along with an indication of the alarm. For example, crime statistics or recent crime reports may be displayed along with an indication of the alarm. As another example, the risk score itself or an indication of the risk score may be presented along with the indication of the alarm. For example, a numerical value between 0 and 100 may be displayed along with an alarm, where 0 represents a lowest likelihood that the alarm is associated with an ongoing crime and 100 represents a highest likelihood that the alarm is associated with an ongoing crime. In some embodiments, this indication may be provided through the use of color coding with high-risk alarms displayed, for example, in red and low-risk alarms displayed, for example, in green.

The screens depicted in FIGS. 10 and 11 are provided as illustrative examples of how risk scores can be used to configure the presentation of alarms to an operator and are not to be construed as limiting. Other GUIs can be configured differently based on risk score while remaining within the scope of the present disclosure. Further, while the example GUIs are described as being presented at operator devices 462, such GUIs can similarly be displayed at any other computing devices, including administrator devices 464 and/or end user devices 466.

Presenting Forecast Risk Information to Users

In some embodiments, forecast risk scores, or other information indicative of forecast risk scores (collectively referred to as "forecast risk information") can be presented to users, for example, via an interface 204.

Figure 12:
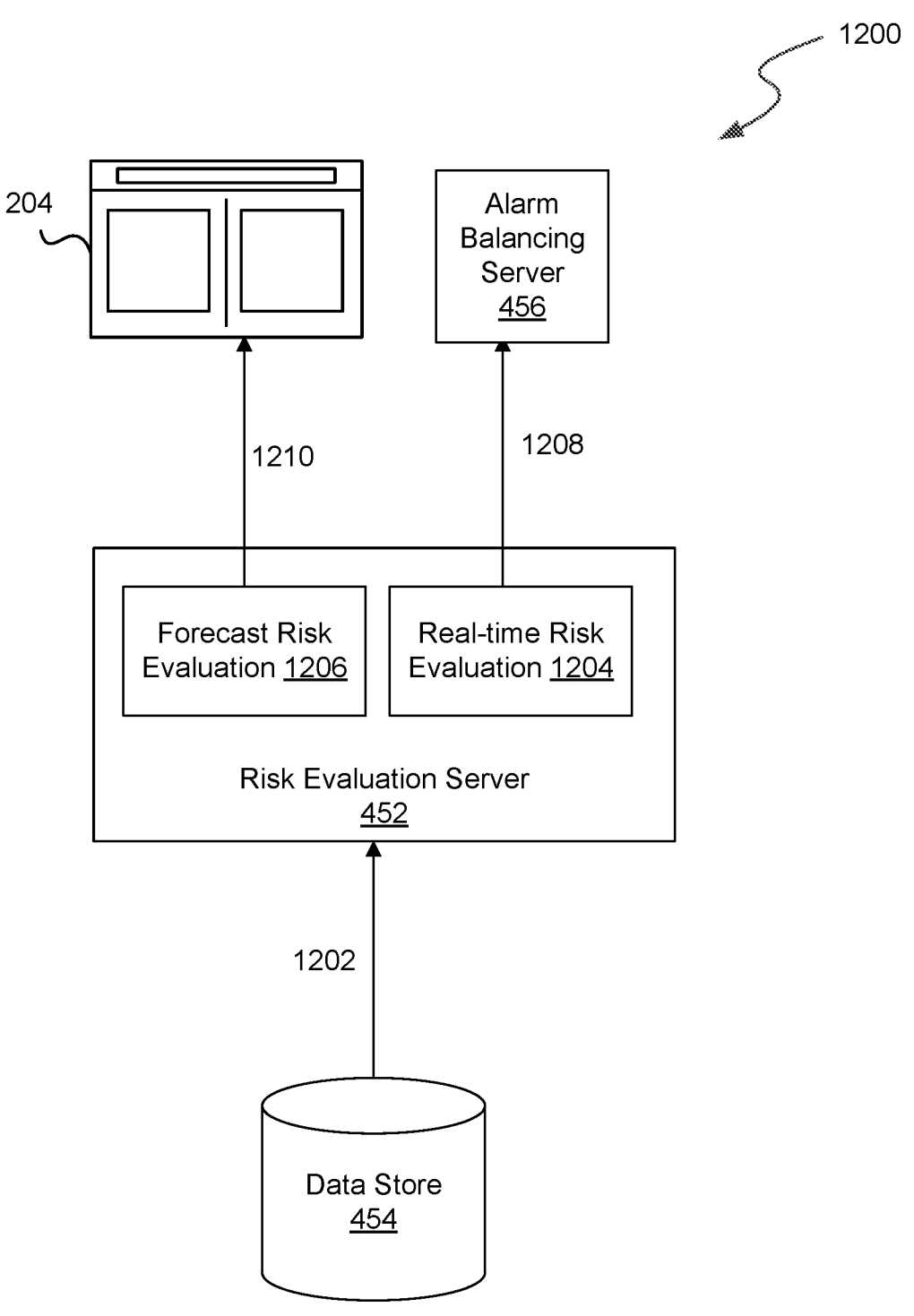
FIG. 12 shows an architecture flow diagram that illustrates an example process for presenting forecast risk information to users.

FIG. 12 shows an architecture flow diagram that illustrates an example process 1200 for presenting forecast risk information to users. Certain steps of the example process 1200 are described with respect to the components of the example communication environment 400 described with respect to FIG. 4.

Example process 1200 begins at step 1202 with a risk evaluation server 452 receiving and/or retrieving premises data, for example, from data store 454 as described with respect to step 804 in example process 800.

The risk evaluation server 452 then processes the received premises data, for example, using one or more machine learning risk models, to generate one or more risk scores for the premises 404. In some embodiments, the risk evaluation server 452 may implement both a real-time risk evaluation process 1204 and a forecast risk evaluation process 1206. In some embodiments, the real-time risk evaluation process 1204 and forecast risk evaluation process 1206 may utilize different machine learning models to process premises data.

As previously discussed, a real-time risk score may represent quantified risk evaluation based on real-time conditions at the premises. In other words, the real-time risk evaluation process 1204 may include processing premises data in real-time or near-real-time as it is generated at and retrieved from sensors at the premises 404 and/or other data sources. Real-time risk scores generated by the process 1204 may be utilized to inform other processes that rely on real-time response such as alarm routing. For example, as discussed with respect to step 808 in process 800, real-time risk scores can be provided at step 1208 to an alarm balancing server 456 for use in routing alarms to operators.

Conversely, a forecast risk score may represent a quantified risk evaluation for some time in the future based on predicted or forecast conditions. In some embodiments, the forecast risk evaluation process 1206 may include processing historical premises data that has been stored at data store 454. By processing historical premises data, the forecast risk evaluation process 1206 may identify trends or other patterns that can be utilized to predict the risk at a premises at some time in the future. In some embodiments, the forecast risk evaluation process 1206 may include processing real-time premises data in addition to, or instead of, historical premises data.

At step 1210 a forecast risk score, or information indicative of the forecast risk score, is presented to a user, for example, via an interface 204. The manner in which a forecast risk score, or associated information, is presented will vary in different embodiments. In some embodiments, an end user, such as a premises owner or security manager, may access interface 204 to view a dashboard that includes various information associated with the premises 404. This information can include current conditions based on premises sensor data, live streams from monitoring devices 420, such as security cameras 422, as well as forecast risk information that the end user can use to perform security analytics associated with their premises. For example, using forecast risk information, an end user can plan and evaluate security needs at the premises 404, plan security upgrades, evaluate insurance needs, etc.

The forecast risk information can be presented via interface 204 as a numerical value (or time-series of numerical values). For example, a dashboard presented via interface 204 may include an element that charts forecast risk scores over some time horizon (e.g., every week for the next three months). In some embodiments, this element is interactive allowing the end user to adjust the interval and time period over which forecast risk scores are presented.

In some embodiments, forecast risks scores can be processed to generate visualizations that convey forecast risk information to the end user. For example, a heat map can be generated based on color coding to forecast risk levels for the premises. The heat map can be animated to illustrate dynamically changing risk levels over some time horizon.

Although not depicted in FIG. 12, in some embodiments, real-time risk information can similarly be presented to end users via an interface 204.

Allocating Resources Based on Risk Score

Figure 13:
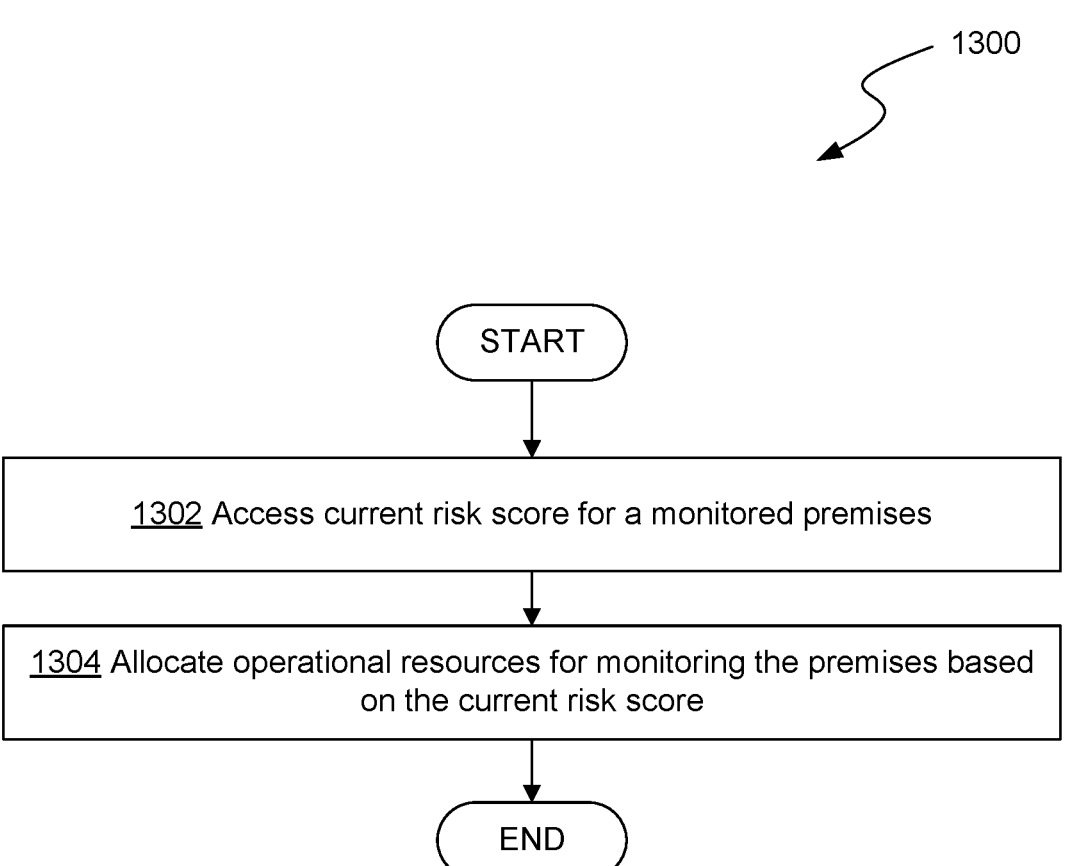
FIG. 13 shows a flow diagram of an example process for allocating resources based on risk score.

In some embodiments, a risk score can be utilized to allocate resources for monitoring a premises. FIG. 13 depicts a flow diagram of an example process 1300 for allocating resources based on risk score. The steps of example process 1300 may be implemented as instructions stored in memory that are executed by a computing device associated with a security platform 402 described with respect to FIG. 4.

Example process 1300 begins at step 1302 with accessing a risk score for the monitored premises. In some embodiments, the risk score associated with an alarm may be attached as metadata to the received alarm. As previously mentioned, a risk score for a given premises may be accessed from a risk evaluation server 452 or associated data store 454.

Example process continues at step 1304 with allocating resources for monitoring the premises based on the risk score. Resources in this context may refer to human resources (e.g., operators) as well as technology resources (e.g., processing resources, memory resources, network resources, monitoring resources, etc.). Accordingly, the allocation of resources at step 1304 may include different processes depending on the types of resources allocated.

For example, in some embodiments, a monitoring operations facility 408 can dynamically respond to heighted risk scores observed during certain days, times, etc. by staffing more operators during such periods of heightened risk. In this example, a supervisor may monitor risk scores for the multiple different premises and set staffing schedules based on observable trends. In some embodiments, the system may assist the supervisor in performing such functions, for example, by presenting analytics and/or staffing recommendations.

In some embodiments, certain computing resources may be allocated based on observed risk scores. For example, in response to identifying heightened risk scores in a certain geographic region, the security platform may allocate computing resources, such as network bandwidth and processors, to handle an expected influx of alarms from monitored premises in that region. As another example, network bandwidth may be allocated to prioritize the transmission of live video feeds and other information from premises associated with high risk alarms to the monitoring operations facility 408. In some embodiments, this allocation of computing resources may include utilizing on-demand cloud-computing resources that are provided by a third-party cloud computing provider.

Training Machine Learning Risk Models

Figure 14:
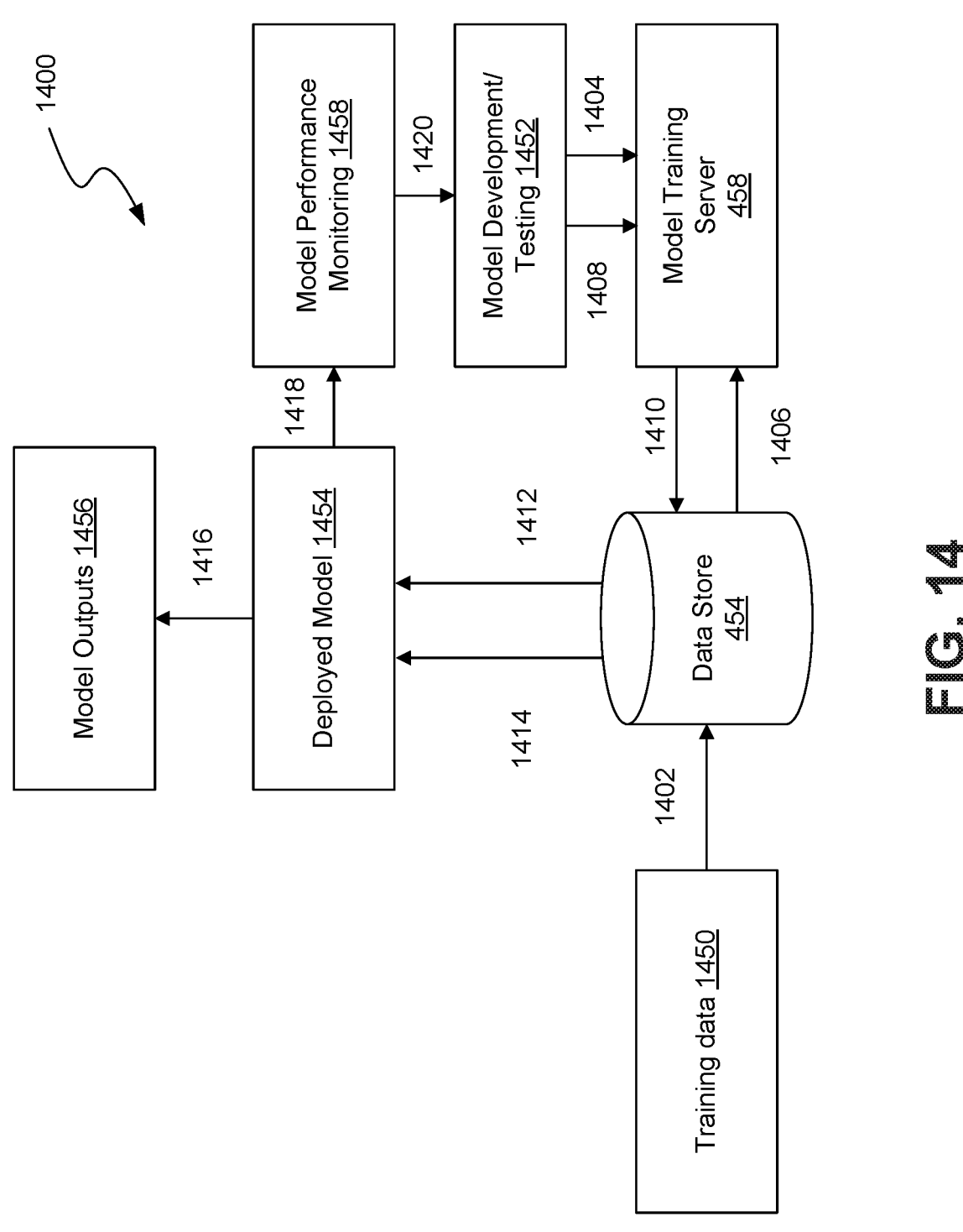
FIG. 14 shows an architecture flow diagram of an example process for training and deploying machine learning models that are used to generate risk scores.

The risk models used to generate the risk scores based on premises data may implement machine learning techniques. FIG. 14 depicts an architecture flow diagram of an example process 1400 for training and deploying machine learning models. Certain steps of the example process 1400 are described with respect to the components of the example communication environment 400 described with respect to FIG. 4.

Example process 1400 begins at step 1402 with storing training data 1450 in a data store 454 associated with a security platform 402. The training data 1405 in this context can include premises data generated by sensors at a premises 404, premises data from other third-party sources 410, feedback data (e.g., in the form of event log data of a monitoring operations facility 408), etc. The training data 1450 may include real-time data and/or historical data.

In some embodiments, the training data 1450 may be labeled with truth information to assist in the model training process. For example, premises data indicative of specific conditions known by security experts to be associated with heightened criminal activity can be labeled as such in the training data 1450. Similarly, historical premises data retrieved at a time that an actual crime occurred can can be labeled as such in the training data 1450. In some embodiments, the training data 1450 may be weighted prior to training to impact how certain data points affect outputs of the resulting model.

At step 1404, a machine learning model is configured by a user that is associated with model development and/or testing 1452. The "user" in this context may be an administrator of the security platform 402 or someone with more specialized expertise in machine learning model development, such as a data scientist. Configuring the model prior to training may include, for example, formulating a problem to be solved (e.g., predicting criminal activity), reviewing the training data, selecting an appropriate machine learning algorithm to use, and/or setting one or more hyperparameter values for the model. In some embodiments, a user can configure a machine learning model prior to training by selecting one or more options or setting one or more hyperparameter values that are communicated to the model training server 458.

At step 1406, the configured machine learning model is trained using at least some of the training data 1450 stored at data store 454. In some embodiments, step 1406 may include the model training server 458 accessing at least some of the training data 1450 stored at data store 454 and processing the accessed training data 1450 using hyperparameter values and/or other settings associated with the model configured at step 1404. In the case of an artificial neural network, hyperparameters may include a quantity of layers and/or units (i.e., neurons) in the neural network, a dropout rate, learning rate, number of iterations, etc.

The model training process may utilize desired outputs included in the training data (e.g., truth labels) to learn and set various model parameters. In the case of an artificial neural network, these parameters may include, for example, connections between neurons, weights of the connections, and biases in the neurons.

Once trained, the machine learning model can be tested at step 1408 prior to deployment. For example, a user associated with model development and/or testing 1452 can cause the model training server 458 to run one or more tests on the trained model, for example, by processing data accessed from data store 454 using the trained model. In most cases, the model training server 458 will use data other than the training data 1450 to test the model.

Although not depicted as such in FIG. 14, the model configuration, training, and testing may be an interactive process that is performed several times before a machine learning model is developed that is suitable for deployment. For example, as part of model testing at step 1408, a user associated with model testing and/or development 1452 may review results of the testing and decide to reconfigure the model, for example, by adjusting one or more hyperparameter values. This process is generally referred to as hyperparameter tuning.

Once the testing is complete, the trained machine learning model can be deployed for use in the risk evaluation process. In some embodiments, the model training server 458 may, at step 1410, store the trained model in data store 454 where it can be accessed, at step 1412, for use by an online execution computer system. For example, a risk evaluation server 452 may, at step 1412, access the trained model from data store 454. The model accessed at step 1412 is depicted in FIG. 14 as deployed model 1454. As previously discussed, the trained model may be stored as part of a library or registry that includes multiple machine learning models.

At step 1414, premises data is accessed from data store 454 and processed using the deployed model 1454 to, at step 1416, generate one or more model outputs 1456, such as a risk score. For example, the risk evaluation server 452 may access premises data at step 1414, process the premises data using the deployed machine learning model 1454, and generate a risk score at step 1416. The generated outputs 1456 (e.g., a risk score) can then be utilized to inform other processes, such as alarm monitoring, as previously discussed.

In some embodiments, the performance of the deployed machine learning model 1454 is monitored at step 1418. For example, a performance monitoring process 1458 may analyze outputs of the deployed machine learning model 1454 and generate performance metric values based on the analysis. Performance metrics can include, for example, accuracy, latency, confidence, confusion matrices, sensitivity, specificity, error, etc. In some embodiments, feedback data (e.g., in the form of event log data of a monitoring operations facility 408) can be used to monitor the performance of a given mode. For example, as discussed with respect to process 800 in FIG. 8, an alarm generated at a premises 404 will be reviewed at a monitoring operations facility 408. An individual, such as a supervisor, will determine whether the alarm is associated with actual criminal activity and provide feedback data, for example, in the form of a log of the alarm review. This feedback data can be compared to the output risk score for the premises at the time the alarm was generated to determine an accuracy of the risk score. Other processes may be employed to generate other performance metrics associated with the deployed model 1454.

In some embodiments, the results of post-deployment model performance monitoring can be used at step 1420 to guide model development and/or testing 1452. For example, in some embodiments, a user associated with model development and/or testing may review performance metrics of the deployed model 1454 and utilize this information to configure and/or tune new models for training. In some embodiments, a model performance monitoring process 1458 may automatically trigger a model retraining process, for example, in response to detecting a performance metric of the deployed model 1454 falling below a threshold value.

Figure 15:
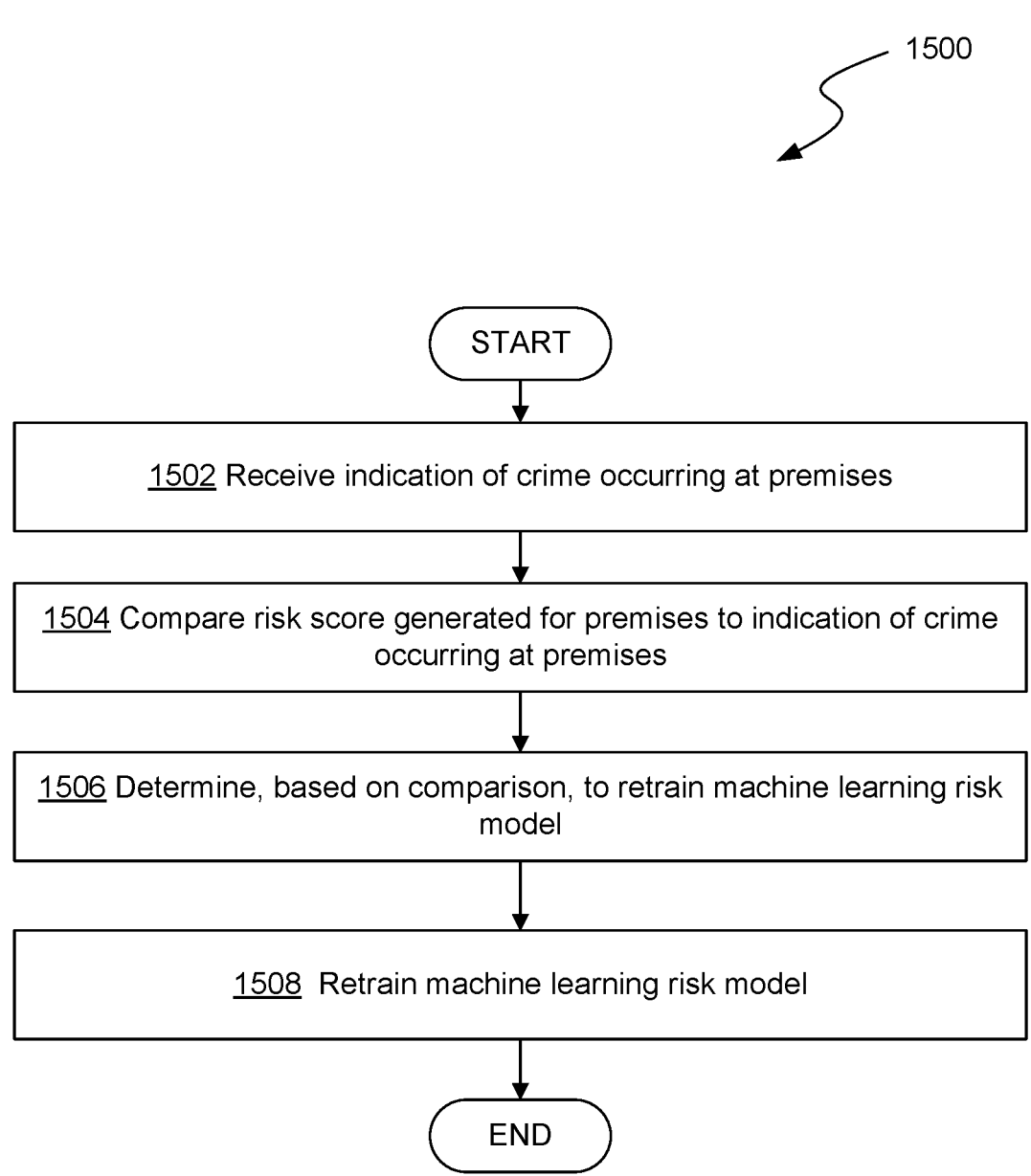
FIG. 15 shows a flow diagram of an example process for retraining a machine learning model.

As previously alluded to, in some embodiments, model retraining can be triggered by events occurring at the premises. For example, a machine learning risk model may be retrained in response to receiving an indication that a crime has actually occurred at a premises. FIG. 15 shows a flow diagram of an example process 1500 for retraining a machine learning model (e.g., a machine learning risk model) in response to receiving an indication of a crime occurring at a premises. The steps of example process 1500 may be implemented as instructions stored in memory that are executed by a computing device associated with a security platform such as the model training server 458 described with respect to FIG. 4. In some embodiments, the example process 1500 may be part of the model performance monitoring process 1458 described with respect to FIG. 14.

Example process 1500 begins at step 1502 with receiving an indication that a crime or other event has occurred at a premises. For example, as described with respect to FIG. 8, an operator or supervisor may review an alarm generated based on detected activity at a premises and confirm or disconfirm that an event associated with the alarm has actually occurred at the premises. Specifically, in some embodiments, a supervisor may input a log entry confirming that an alarm is associated with an actual crime occurring at the premises. That log entry may be transmitted back to the security platform 402 where it is received at step 1502.

At step 1504, a risk score generated for the premises is compared to the indication received at step 1502. For example, in response to receiving the indication at step 1502, a computer system implemented process 1500 may retrieve a risk score generated by a machine learning risk model based on premises data gathered at the time the crime occurred. Alternatively, the computer system may retrieve historical premises data gathered at the time the crime occurred and process that historical premises data using the machine learning risk model to generate a risk score.

In any event, the generated or retrieved risk score may be compared to the received indication of the crime occurring to at step 1506 determine whether to retrain the machine learning risk model. As previously discussed, a risk score may represent a quantified evaluation of a likelihood of criminal activity occurring at a premises. If a generated risk score does not conform with actual detected criminal activity at a premises, that may indicate a problem in the accuracy of the risk model which may necessitate a retraining of the model.

In some embodiments, the decision to retrain a risk model may be based on a threshold criterion. For example, if an indication is received of an actual crime occurring, a computer system implementing process 1500 may automatically retrain a risk model in response to determining, based on the comparison, that a risk score output by the model at a time the crime occurred is below a threshold value. The threshold used to determine whether to retrain a model may be static (e.g., set by an administrator user) or may dynamically change based on detected conditions (e.g., a number of alarms generated for the premises or a current workload for the risk model).

Example process 1500 concludes at step 1508 with retraining the machine learning risk model in response to the comparison at step 1506. In some embodiments, step 1508 may include decommissioning the machine learning risk model (i.e., removing the model from a deployed state), training the decommission model using updated training data. Alternatively, in some embodiments, a new version of the machine learning risk model may be trained using updated training data and deployed to replace a previous version of the machine learning risk model. In any case, the updated training data may include for example, historical premises data that has been labeled based on the indication received at step 1502. For example, a combination of historical premises data that was gathered at a time the conformed crime occurred can be labeled as indicative of a high likelihood of criminal activity and used to train or retrain a machine learning risk model.

Example process 1500 is described in the context or retraining a model in response to receiving an indication that a crime has occurred. Other processed may similarly be implemented to trigger the training and/or retraining of models in response to receiving indications of the occurrence of other types of non-criminal events (e.g., fire, flooding, etc.) and/or the non-occurrence of events. For example, an operator or supervisor may review an alarm generated based on detected activity at a premises and confirm that the alarm is not associated with any criminal or otherwise high-risk activity by clearing the alarm. An indication of the clearance of the alarm can be transmitted to the security platform 402 to trigger the training or retraining of a machine learning risk model. For example, if a risk score generated at a time the alarm was generated indicated a high likelihood of criminal activity, the clearance of the alarm by the operator may indicate a problem in the accuracy of the risk model which may necessitate a retraining of the model.

Processing System

Figure 16:
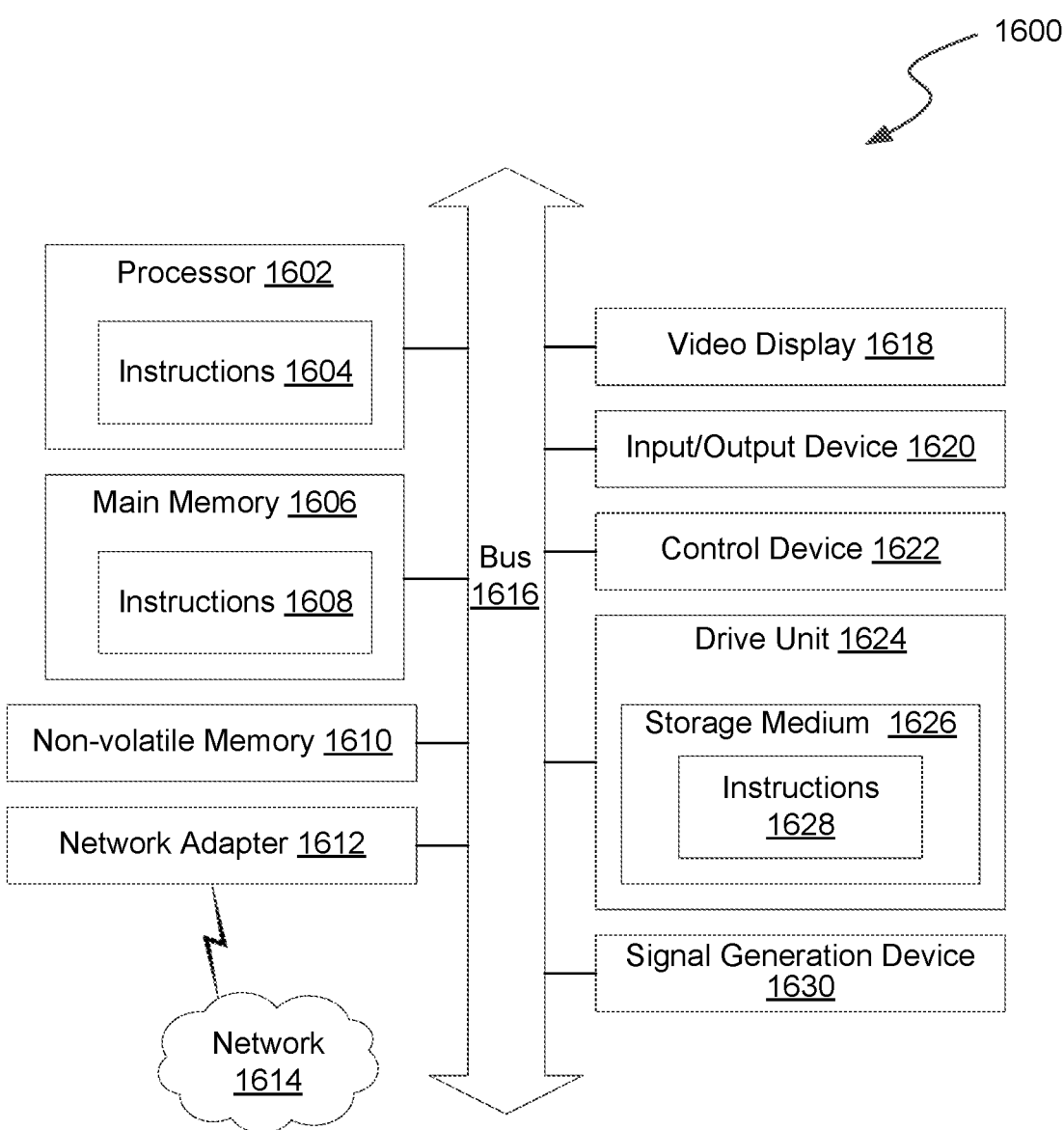
FIG. 16 shows a block diagram of an example computer processing system in which at least some operations described herein can be implemented.

FIG. 16 is a block diagram illustrating an example of a processing system 1600 in which at least some operations described herein can be implemented. For example, some components of the processing system 1600 may be part of a computing device or system of computing devices associated with the communication environment 400 depicted in FIG. 4.

The processing system 1600 may include one or more processing units ("processors") 1602, main memory 1606, non-volatile memory 1610, network adapter 1612 (e.g., network interface), video display 1618, input/output devices 1620, control device 1622 (e.g., keyboard and pointing devices), drive unit 1624, including a storage medium 1626, and signal generation device 1630 that are communicatively connected to a bus 1616. The bus 1616 is illustrated as an abstraction that represents one or more physical buses and/or point-to-point connections that are connected by appropriate bridges, adapters, or controllers. The bus 1616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processors 1602 may include programmable circuitry and/or hardwired non-programmable circuitry. For example, programmable circuitry may include one or more general purpose microprocessors, such as central processing units (CPU) or graphical processing units (GPU). Programmable circuitry may also include special-purpose processors, such as application-specific integrated circuits (ASICs), programmable logic devices (PLDs), field-programmable gate arrays (FPGAs), etc.

While the main memory 1606, non-volatile memory 1610, and storage medium 1626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1628. The term "machine-readable medium" and "storage medium" shall also be taken to include any medium that is capable of storing, encoding, or carrying a set of instructions for execution by the processing system 1600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1604, 1608, 1628) set at various times in various memory and storage devices in a computing device. When read and executed by the one or more processors 1602, the instruction(s) cause the processing system 1600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media, such as volatile and non-volatile memory devices 1610, floppy and other removable disks, hard disk drives, optical discs, and transmission-type media, such as digital and analog communication links.

The network adapter 1612 enables the processing system 1600 to mediate data in a network 1614 with an entity that is external to the processing system 1600 through any communication protocol supported by the processing system 1600 and the external entity. The network adapter 1612 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1612 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:

receiving, by a computer system, premises data, wherein the premises data comprises (i) sensor data generated by at least one monitoring device located at a physical premises, and (ii) third-party data associated with a geographical location of the physical premises from devices remote to the physical premises;

selecting, by the computer system, a machine learning model from a plurality of machine learning models based on a type of activity to detect at the physical premises and the geographical location of the physical premises;

processing, by the computer system, the premises data using the machine learning model to generate a risk score associated with the physical premises, wherein the risk score is updated at a time when the premises data is received by the computer system or at a time period after the premises data is received;

dynamically adjusting, by the computer system, a sensitivity level of the at least one monitoring device located at the physical premises based on the risk score associated with the physical premises, wherein the dynamic adjustment of the sensitivity level responds to a threshold criterion associated with the risk score, wherein the risk score is updated with new premises data, and wherein the risk score satisfying the threshold criterion will reduce the sensitivity level and the risk score exceeding the threshold criterion will increase the sensitivity level;

receiving, by the computer system, an alarm generated by the the at least one monitoring device operating at the adjusted sensitivity level, with the risk score exceeding the threshold criterion, and located at the physical premises, wherein the risk score exceeding the threshold criterion indicates the type of activity has occurred at the physical premises;

allocating, by the computer system, network bandwidth or one or more network processors to respond to the alarm based on the risk score exceeding the threshold criterion; and transmitting, by the computer system, a notification indicative of the alarm to at least one operator remote to the computer system.

2. The method of claim 1, further comprising:

causing display of a visual output indicative of the alarm at a display device, the visual output configured based on the risk score associated with the physical premises.

3. The method of claim 1, further comprising:

receiving, by the computer system, feedback information indicative of whether the alarm was associated with actual criminal activity; and causing, by the computer system, the machine learning model to be updated based on the feedback information.

4. The method of claim 1, further comprising:

aggregating the risk score associated with the physical premises with risk scores associated with other physical premises to generate an aggregated risk score, wherein the at least one operator is selected based on the aggregated risk score.

5. The method of claim 1, wherein the risk score includes:

a real-time risk value representing a quantified evaluation of a current likelihood of criminal activity occurring at the physical premises;

a historical risk value representing a quantified evaluation of a past likelihood of criminal activity occurring at the physical premises; and a forecast risk value representing a quantified evaluation of a future likelihood of criminal activity occurring at the physical premises.

6. The method of claim 5, wherein the real-time risk value, the historical risk value, and the forecast risk value are weighted based on the geographical location of the physical premises.

7. The method of claim 1, wherein the at least one operator is associated with a tier of operators, wherein the at least one operator is selected in response to determining that the risk score satisfies a specified criterion for routing alarms to the tier of operators, and wherein the tier of operators are associated with a centralized monitoring operations facility remote to the physical premises.

8. A system comprising:

one or more processors; and one or more memories storing instructions that, when executed by the one or more processors, cause the system to perform a process comprising:

receiving, by a computer system, premises data, wherein the premises data comprises (i) sensor data generated by at least one monitoring device located at a physical premises, and (ii) third-party data associated with a geographical location of the physical premises from devices remote to the physical premises;

selecting, by the computer system, a machine learning model from a plurality of machine learning models based on a type of activity to detect at the physical premises and the geographical location of the physical premises;

processing, by the computer system, the premises data using the machine learning model to generate a risk score associated with the physical premises, wherein the risk score is updated at a time when the premises data is received by the computer system or at a time period after the premises data is received;

dynamically adjusting, by the computer system, a sensitivity level of the at least one monitoring device located at the physical premises based on the risk score associated with the physical premises, wherein the dynamic adjustment of the sensitivity level responds to a threshold criterion associated with the risk score, wherein the risk score is updated with new premises data, and wherein the risk score satisfying the threshold criterion will reduce the sensitivity level and the risk score exceeding the threshold criterion will increase the sensitivity level;

receiving, by the computer system, an alarm generated by the at least one monitoring device operating at the adjusted sensitivity level, with the risk score exceeding the threshold criterion, and located at the physical premises, wherein the risk score exceeding the threshold criterion indicates the type of activity has occurred at the physical premises;

allocating, by the computer system, network bandwidth or one or more network processors to respond to the alarm based on the risk score exceeding the threshold criterion; and transmitting, by the computer system, a notification indicative of the alarm to at least one operator remote to the computer system.

9. The system according to claim 8, wherein the process further comprises:

causing display of a visual output indicative of the alarm at a display device, the visual output configured based on the risk score associated with the physical premises.

10. The system according to claim 8, wherein the process further comprises:

receiving, by the computer system, feedback information indicative of whether the alarm was associated with actual criminal activity; and causing, by the computer system, the machine learning model to be updated based on the feedback information.

11. The system according to claim 8, wherein the process further comprises:

aggregating the risk score associated with the physical premises with risk scores associated with other physical premises to generate an aggregated risk score, wherein the at least one operator is selected based on the aggregated risk score.

12. The system according to claim 8, wherein:

a real-time risk value representing a quantified evaluation of a current likelihood of criminal activity occurring at the physical premises;

a historical risk value representing a quantified evaluation of a past likelihood of criminal activity occurring at the physical premises; and a forecast risk value representing a quantified evaluation of a future likelihood of criminal activity occurring at the physical premises.

13. The system according to claim 12, wherein the real-time risk value, the historical risk value, and the forecast risk value are weighted based on the geographical location of the physical premises.

14. The system according to claim 8, wherein the at least one operator is associated with a tier of operators, wherein the at least one operator is selected in response to determining that the risk score satisfies a specified criterion for routing alarms to the tier of operators, and wherein the tier of operators are associated with a centralized monitoring operations facility remote to the physical premises.

15. A non-transitory computer-readable medium storing instructions that, when executed by a computing system, cause the computing system to perform operations comprising:

receiving, by a computer system, premises data, wherein the premises data comprises (i) sensor data generated by at least one monitoring device located at a physical premises, and (ii) third-party data associated with a geographical location of the physical premises from devices remote to the physical premises;

selecting, by the computer system, a machine learning model from a plurality of machine learning models based on a type of activity to detect at the physical premises and the geographical location of the physical premises;

processing, by the computer system, the premises data using the machine learning model to generate a risk score associated with the physical premises, wherein the risk score is updated at a time when the premises data is received by the computer system or at a time period after the premises data is received;

dynamically adjusting, by the computer system, a sensitivity level of the at least one monitoring device located at the physical premises based on the risk score associated with the physical premises, wherein the dynamic adjustment of the sensitivity level responds to a threshold criterion associated with the risk score, wherein the risk score is updated with new premises data, and wherein the risk score satisfying the threshold criterion will reduce the sensitivity level and the risk score exceeding the threshold criterion will increase the sensitivity level;

receiving, by the computer system, an alarm generated by the at least one monitoring device operating at the adjusted sensitivity level, with the risk score exceeding the threshold criterion, and located at the physical premises, wherein the risk score exceeding the threshold criterion indicates the type of activity has occurred at the physical premises;

allocating, by the computer system, network bandwidth or one or more network processors to respond to the alarm based on the risk score exceeding the threshold criterion; and transmitting, by the computer system, a notification indicative of the alarm to at least one operator remote to the computer system.

16. The non-transitory computer-readable medium of claim 15, wherein the operations further comprise:

causing display of a visual output indicative of the alarm at a display device, the visual output configured based on the risk score associated with the physical premises.

17. The non-transitory computer-readable medium of claim 15, wherein the operations further comprise:

receiving, by the computer system, feedback information indicative of whether the alarm was associated with actual criminal activity; and causing, by the computer system, the machine learning model to be updated based on the feedback information.

18. The non-transitory computer-readable medium of claim 15, wherein the operations further comprise:

aggregating the risk score associated with the physical premises with risk scores associated with other physical premises to generate an aggregated risk score, wherein the at least one operator is selected based on the aggregated risk score.

19. The non-transitory computer-readable medium of claim 15, wherein:

a real-time risk value representing a quantified evaluation of a current likelihood of criminal activity occurring at the physical premises;

a historical risk value representing a quantified evaluation of a past likelihood of criminal activity occurring at the physical premises; and a forecast risk value representing a quantified evaluation of a future likelihood of criminal activity occurring at the physical premises, wherein the real-time risk value, the historical risk value, and the forecast risk value are weighted based on the geographical location of the physical premises.

20. The non-transitory computer-readable medium of claim 15, wherein the at least one operator is associated with a tier of operators, wherein the at least one operator is selected in response to determining that the risk score satisfies a specified criterion for routing alarms to the tier of operators, and wherein the tier of operators are associated with a centralized monitoring operations facility remote to the physical premises.

\* \* \* \* \*